(12) United States Patent
Hernandez et al.

(10) Patent No.: US 11,783,256 B1
(45) Date of Patent: Oct. 10, 2023

(54) SYSTEMS AND METHODS FOR WEB-BASED PERFORMANCE MANAGEMENT AND REPORTING

(71) Applicant: Wells Fargo Bank, N.A., San Francisco, CA (US)

(72) Inventors: Dustin M. Hernandez, Sacramento, CA (US); Vernard M. Sloggett, San Francisco, CA (US); Jason E. Taylor, Harrisburg, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 375 days.

(21) Appl. No.: 16/714,565

(22) Filed: Dec. 13, 2019

(51) Int. Cl.
*G06Q 10/0633* (2023.01)
*G06Q 10/0639* (2023.01)
*G06Q 10/0631* (2023.01)

(52) U.S. Cl.
CPC ..... *G06Q 10/0633* (2013.01); *G06Q 10/06316* (2013.01); *G06Q 10/06393* (2013.01)

(58) Field of Classification Search
CPC ............ G06Q 10/06; G06Q 10/0633; G06Q 10/06316; G06Q 10/06393
USPC ........................................ 705/7.38
See application file for complete search history.

(56) References Cited

U.S. PATENT DOCUMENTS

| | | | |
|---|---|---|---|
| 8,843,883 B2* | 9/2014 | Chowdhary et al. | G06Q 10/06 717/109 |
| 8,869,027 B2 | 10/2014 | Louch et al. | |
| 8,954,871 B2 | 2/2015 | Louch et al. | |
| 9,286,413 B1 | 3/2016 | Coates et al. | |
| 9,710,815 B2 | 7/2017 | MacIntyre et al. | |
| 9,733,916 B2 | 8/2017 | Wang et al. | |
| 9,779,386 B2 | 10/2017 | Swierz, III et al. | |
| 10,114,875 B2 | 10/2018 | Kimchi et al. | |
| 10,146,513 B2 | 12/2018 | Pyhalammi et al. | |
| 10,194,028 B2 | 1/2019 | Vymenets et al. | |
| 10,452,441 B1* | 10/2019 | Subramanian et al. | G06F 40/279 |
| 2004/0225955 A1 | 11/2004 | Ly | |

(Continued)

OTHER PUBLICATIONS

Customize The Home Page Dashboard, printed from the internet address: https://help.infusionsoft.com/help/customize-the-home-page-dashboard on May 20, 2019, 25 pages.
Dashboards, printed from the internet address: https://www.ibm.com/support/knowledgecenter/SSYMRC_6.0.6/com.ibm.jazz.dashboard.doc/topics/c_about_dashboards.html on May 20, 2019, 4 pages.

(Continued)

Primary Examiner — Timothy Padot
(74) Attorney, Agent, or Firm — Foley & Lardner LLP

(57) ABSTRACT

A method for providing a performance dashboard to a user associated with an enterprise comprises retrieving user information pertaining to the user. The method further comprises determining a list of computational tasks associated with generating the performance dashboard based at least in part on the user information. The method further comprises determining a load time for each computational task. The method further comprises identifying at least one computational task having a corresponding load time that is above a load time threshold. The method further comprises replacing the at least one computational task with a plurality of sub-tasks. The method further comprises, subsequent to replacing the at least one computational task within the list of computational tasks with the plurality of sub-tasks, generating the performance dashboard using the list of computational tasks. The method further comprises transmitting the performance dashboard to a web browser of the user.

18 Claims, 14 Drawing Sheets

(56) References Cited

U.S. PATENT DOCUMENTS

| | | | | |
|---|---|---|---|---|
| 2006/0173781 | A1* | 8/2006 | Donner | G06Q 30/0204 |
| | | | | 705/65 |
| 2008/0221958 | A1* | 9/2008 | Baumgartner et al. | |
| | | | | G06Q 10/0631 |
| | | | | 705/7.12 |
| 2011/0010690 | A1* | 1/2011 | Howard et al. | G06F 8/456 |
| | | | | 717/128 |
| 2012/0066084 | A1* | 3/2012 | Sneyders | G06Q 30/0601 |
| | | | | 705/26.1 |
| 2013/0073401 | A1* | 3/2013 | Cook | G06Q 30/0277 |
| | | | | 705/14.73 |
| 2015/0127406 | A1* | 5/2015 | Hoen, IV et al. | H04L 63/104 |
| | | | | 705/7.22 |
| 2015/0161536 | A1* | 6/2015 | Mikheev | G06F 16/283 |
| | | | | 705/7.27 |
| 2016/0292611 | A1* | 10/2016 | Boe et al. | G06Q 10/06393 |
| 2017/0192648 | A1 | 7/2017 | Abedin et al. | |
| 2017/0205981 | A1* | 7/2017 | Lee et al. | G06F 9/46 |
| 2018/0259934 | A1* | 9/2018 | Piaskowski et al. | G05B 15/02 |
| 2018/0336449 | A1* | 11/2018 | Adan et al. | G06F 16/3329 |
| 2019/0205442 | A1* | 7/2019 | Vasudev et al. | G06F 16/2379 |

OTHER PUBLICATIONS

Monitor Your Teams Better and Show Off Achievements with Team Dashboards, printed from internet address: https://freshdesk.com/reporting/team-dashboards, May 20, 2019, 8 pages.
Ten ways you can optimise page load time with a website speed test. Vollmer, Charl. Bizcommunity.com Cape Town: Syndicate Media Inc. (Nov. 25, 2015).*

* cited by examiner

| ACTIONS REQUIRED | | |
|---|---|---|
| HIGH PRIORITY ITEMS | | |
| OPEN UTAS | 10 | ⊞ |
| CRITICAL ERRORS | 9 | ⊞ |
| COUNSELING INDICATORS | | |
| LOW ADHERENCE | 218 | ⊞ |
| TARDIES | 179 | ⊞ |
| ABSENCES | 105 | ⊞ |
| RECONCILE TIME TRACKING | | |
| PTO DISCREPANCY | 201 | ⊞ |
| CST DISCREPANCY | 42 | ⊞ |
| KINCARE DISCREPANCY | 1 | ⊟ |
| NAME | TT | EMP |
| | 0:00 | 0:09 ☐ |
| RP TOOL ITEMS | | |
| RP RETURNED ITEMS | 105 | ⊞ |
| MISCELLANEOUS | | |
| MISSING TIMECARDS | 16 | ⊞ |
| COACHING FOLLOW-UPS | 40 | ⊞ |

DISMISSED ITEMS

DISPLAY LEVEL: SUP  MGR  SITE

SYSTEMS AND METHODS FOR WEB-BASED PERFORMANCE MANAGEMENT AND REPORTING

TECHNICAL FIELD

The present application relates to performance management. More particularly, the present application relates to systems and methods for providing a web-based performance dashboard to a user.

BACKGROUND

Companies are generally concerned with the performance of their employees, as well as their adherence to critical business functions and/or processes. In many instances, companies produce varying reports in an attempt to track and monitor employee performance. For example, companies may produce reports pertaining to various employee performance information and/or statistics over time. Performance information and/or statistics associated with the various employees of a company may often be contained or stored within multiple disparate systems and/or databases of the company. As such, tracking and monitoring employee performance and/or using employee performance to aid in the management of employee teams has traditionally been a costly and time-consuming process.

SUMMARY

One example embodiment relates to a method for providing a performance dashboard to a user associated with an enterprise. The method comprises retrieving user information pertaining to the user. The method further comprises determining a list of computational tasks associated with generating the performance dashboard based at least in part on the user information. The method further comprises determining a load time for each computational task of the list of computational tasks. The method further comprises identifying at least one computational task within the list of computational tasks having a corresponding load time that is above a load time threshold. The method further comprises replacing the at least one computational task within the list of computational tasks with a plurality of sub-tasks configured to collectively achieve the at least one computational task. The method further comprises, subsequent to replacing the at least one computational task within the list of computational tasks with the plurality of sub-tasks, generating the performance dashboard using the list of computational tasks. The method further comprises transmitting the performance dashboard to a web browser of the user.

Another example embodiment relates to a method for providing a performance dashboard to a user associated with an enterprise. The method comprises determining a role of the user within the enterprise. The method further comprises selecting at least one widget to include in the performance dashboard, the at least one widget being selected based at least partially on the role of the user within the enterprise. The method further comprises determining user-specific information to be used to populate the at least one widget, the user-specific information being determined based at least partially on the role of the user within the enterprise. The method further comprises generating the performance dashboard including the at least one widget populated with the user-specific information. The method further comprises transmitting the performance dashboard to a web browser of the user.

Another example embodiment relates to a performance management system comprising a business unit computing system, a business location computing system, and a performance management computing system. The business unit computing system is associated with an enterprise and includes a business unit database and a business unit web browser. The business location computing system is in communication with the business unit computing system, is associated with the enterprise, and includes a business location database and a business location web browser. The performance management computing system is in communication with the business unit computing system and the business location computing system, is associated with the enterprise, and includes an enterprise database, a performance management web browser, a graphical user interface, and a processor coupled to machine readable storage media having instructions stored therein that, when executed by the processor, cause the processor to retrieve user information pertaining to a user from at least one of the business unit database, the business location database, and the enterprise database. The instructions, when executed by the processor, further cause the processor to determine a list of computational tasks associated with generating a performance dashboard based at least in part on the user information. The instructions, when executed by the processor, further cause the processor to determine a load time for each computational task of the list of computational tasks. The instructions, when executed by the processor, further cause the processor to identify at least one computational task within the list of computational tasks having a corresponding load time that is above a load time threshold. The instructions, when executed by the processor, further cause the processor to replace the at least one computational task within the list of computational tasks with a plurality of sub-tasks configured to collectively achieve the at least one computational task. The instructions, when executed by the processor, further cause the processor to, subsequent to replacing the at least one computational task within the list of computational tasks with the plurality of sub-tasks, generate the performance dashboard using the list of computational tasks. The instructions, when executed by the processor, further cause the processor to transmit the performance dashboard to at least one of the business unit web browser, the business location web browser, and the performance management web browser for viewing by the user.

These and other features, together with the organization and manner of operation thereof, will become apparent from the following detailed description when taken in conjunction with the accompanying drawings.

BRIEF DESCRIPTION OF THE DRAWINGS

FIG. 2 is a performance dashboard provided by a performance management application shown on a user interface, according to an example embodiment.

FIG. 3 is an actions required widget provided by the performance management application, according to an example embodiment.

FIG. 4 is a performance manager widget provided by the performance management application, according to an example embodiment.

DETAILED DESCRIPTION

Figure 1:
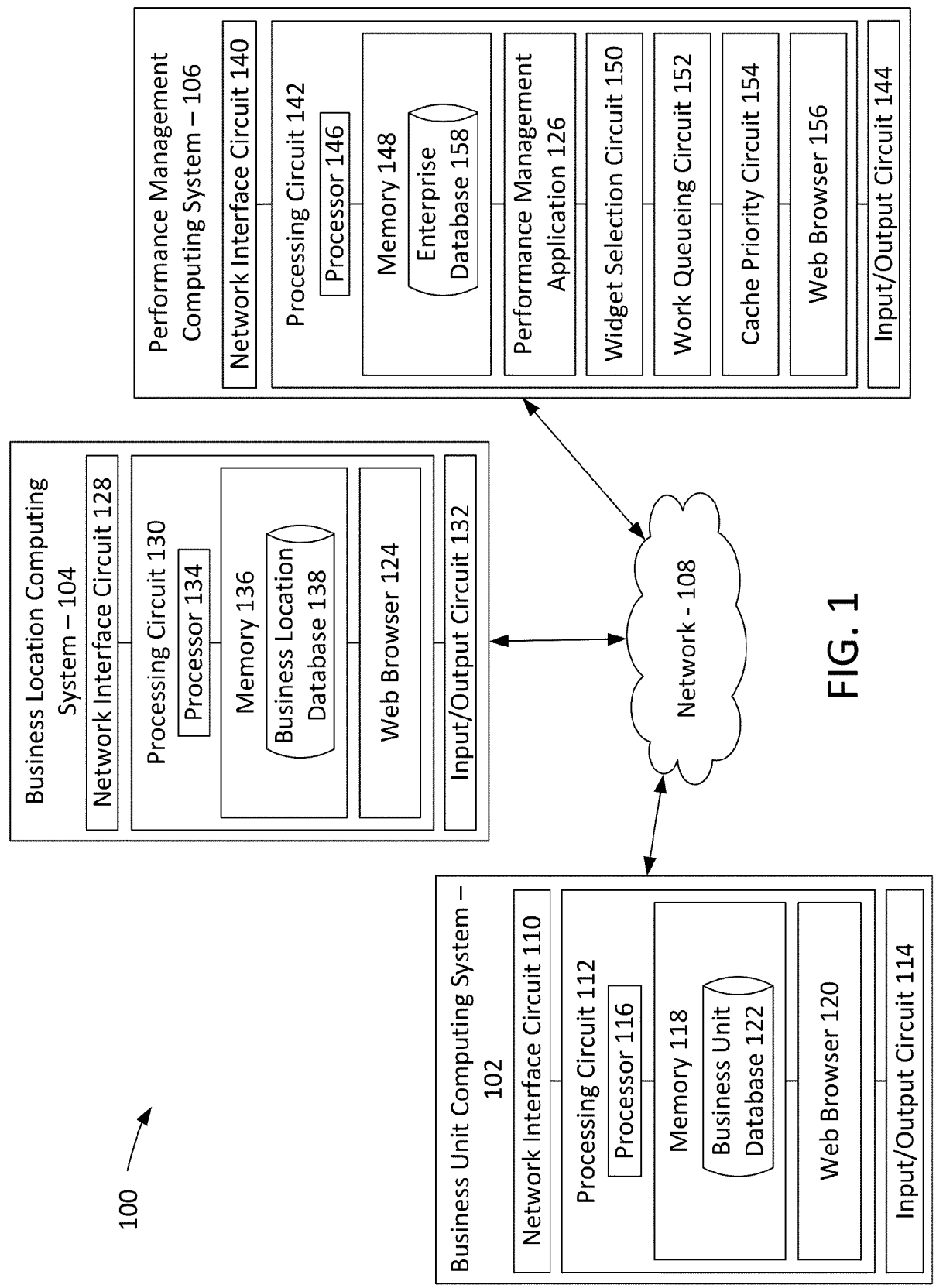
FIG. 1 is a diagram of a performance management computing system, according to an example embodiment.

Referring generally to the figures, systems and methods for providing a performance dashboard to a user associated with an enterprise are shown and described. The systems and methods described herein provide a web-based performance management application that aggregates and provides customized information to the user in the form of a performance dashboard having a plurality of customized widgets.

For example, among other things, the performance management application utilizes a widget selection circuit configured to select specific widgets and pertinent information to be provided to the user based on their role (e.g., position) within the enterprise. Because of the structure of the web-based performance management application, a lightweight (data-wise) dashboard framework may be initially downloaded to a user's browser. This dashboard framework may then be "filled in" with only the widgets and information selected by the widget selection circuit. Accordingly, application data associated with would-be unused widgets is not transmitted to nor downloaded by the user's web browser. As such, the performance dashboard generated by the performance management application may be immediately responsive (or responsive less than a hundredths or a few tenths of a second) to user input upon startup of the performance management application. Further, the performance management application utilizes a work queuing circuit and provides an associated work queuing widget that collectively allow for developers to identify and separate or split large, time-consuming computational tasks associated with generating the performance dashboard into smaller sub-tasks to further expedite load times and responsiveness of the performance dashboard upon startup.

The embodiments of the performance management system and associated performance management application described herein improve current computing systems and payment systems by performing certain steps that cannot be done by conventional computing systems or human actors. For example, the performance management system and associated performance management application provide a performance dashboard that provides continuously-updated and customized information from disparate systems and databases to a user based on the user's role (e.g., position) within an enterprise. Accordingly, the performance management system may automatically make the user aware of pertinent task-related and/or role-specific information. The various widgets of the performance dashboard may further integrate facilitation of various business processes into the performance dashboard for utilization by the user. The performance management application further minimizes the required amount of data transmitted to and downloaded by the user's web browser by transmitting only selected widgets and information to the user's web browser. The performance management application further breaks any unacceptably large computational tasks into a plurality of sub-tasks, thereby maximizing responsiveness to user input upon startup.

Referring now to FIG. 1, a block diagram of a performance management system 100 for providing a user with a performance management dashboard for viewing and managing the performance of and tasks required by various teams and employees associated with an enterprise. Specifically, the performance management dashboard provides various continuously-updated customizable widgets containing information pertaining to the performance of and/or tasks required by the user and the various teams and employees overseen by the user.

The performance management system 100 includes a business unit computing system 102, a business location computing system 104, and a performance management computing system 106. In some embodiments, the business unit computing system 102, the business location computing system 104, and the performance management computing system 106 may be owned and operated by the same entity. For example, the business unit computing system 102, the business location computing system 104, and the performance management computing system 106 may all be owned and operated by an enterprise, such as a credit card issuer, a bank, a retailer, a service provider, or the like. In some embodiments, the business unit computing system 102 and the business location computing system 104 may be owned and operated by a first entity and the performance management computing system 106 may be owned and operated by a second entity. For example, the business unit computing system 102 and the business location computing system 104 may be owned and operated by an enterprise, such as a credit card issuer, a bank, a retail, a service provider, or the like, and the performance management computing system 106 may be owned and operated by a third-party performance management provider. In any case, the business unit computing system 102, the business location computing system 104, and the performance management computing system 106 may be in communication with each other and connected by a network 108.

The business unit computing system 102 may be associated with a particular business unit of the enterprise. The business unit computing system 102 may be any suitable user computing device. For example, the business unit computing system 102 may be a mobile phone, a personal computer (e.g., a desktop computer or a laptop computer), a tablet, a smart watch or other wearable device, or any other suitable user computing device capable of accessing and communicating using local and/or global networks.

The business unit computing system 102 includes a network interface circuit 110, a processing circuit 112, and an input/output circuit 114. The network interface circuit 110 enables the business unit computing system 102 to exchange information over the network 108. That is, the network interface circuit 110 is used to establish connections with other computing systems by way of the network 108. The network interface circuit 110 includes program logic that facilitates connection of the business unit computing system 102 to the network 108. For example, the network interface circuit 110 may include any combination of a wireless network transceiver (e.g., a cellular modem, a Bluetooth transceiver, a WiFi transceiver, etc.) and/or a wired network transceiver (e.g., an Ethernet transceiver). In some arrangements, the network interface circuit 110 includes the hardware and machine-readable media sufficient to support communication over multiple channels of data communication. Further, in some arrangements, the network interface circuit 110 includes cryptography capabilities to establish a secure or relatively secure communication session in which data communicated over the session is encrypted.

To provide the functions of the business unit computing system 102, the network interface circuit 110 provides a relatively high-speed link to the network 108, which may be any combination of a local area network (LAN), an intranet (e.g., a private banking or retailer network), the Internet, or any other suitable communications network, either directly or through another external interface.

The processing circuit 112 includes a processor 116, a memory 118, and a web browser 120. The processor 116 may be implemented as a general-purpose processor, an application specific integrated circuit (ASIC), one or more field programmable gate arrays (FPGAs), a digital signal processor (DSP), a group of processing components, or other suitable electronic processing components. The memory 118 includes one or more memory devices (e.g., RAM, NVRAM, ROM, Flash Memory, hard disk storage, etc.) that store data and/or computer code for facilitating the various processes described herein. That is, in operation and use, the memory 118 stores at least portions of instructions and data for execution by the processor 116 to control the functionality of the processing circuit 112. For example, the memory 118 comprises cache-type memory configured to retrievably store at least portions of instructions and data pertaining to various web-based applications. Moreover, the memory 118 may be or include tangible, non-transient volatile memory or non-volatile memory.

As such, the business unit computing system 102 is configured to run a variety of application programs and store associated data in a database of the memory 118. Some of these applications may be network-based or web-based applications (e.g., web applications) provided via the web browser 120, which may be executed remotely from the business unit computing system 102 (e.g., by the performance management computing system 106). One such web-based application may be a performance management application 126 provided by the performance management computing system 106, as will be described below. The performance management application 126 (as well as various other web applications) may include software such as HTML, XML, WML, SGML, PHP (Hypertext Preprocessor), CGI, and like languages. Accordingly, the business unit computing system 102 includes software and/or hardware capable of implementing a network-based or web application.

The memory 118 may include a business unit database 122. In some instances, the business unit database 122 may be configured to retrievably store information pertaining to various employees and/or potential employee roles (e.g., job titles) associated with the enterprise (e.g., a financial institution) associated with the business unit computing system 102. For example, the information may include names, employee roles, calendar information, length of employment, etc. for various employees employed by or associated with the enterprise. In some instances, the information may comprise task-related information and/or performance-related information. For example, the task-related information may include a set of tasks required by a specific employee role. In some instances, the performance-related information may pertain to various employee achievements. In some instances, the information may further include business unit information pertaining to the business unit associated with the business unit computing system 102.

The information stored within the business unit database 122 (or elsewhere within the memory 118) may be selectably retrievable by various components of the system 100 (e.g., the business location computing system 104, the performance management computing system 106) via the network 108 (e.g., using the network interface circuit 110, the network interface circuit 128, and/or the network interface circuit 140). In some instances, the information stored within the business unit database 122 may be updated in real-time. In some instances, the information within the business unit database 122 may be updated on a specified schedule (e.g., daily, bi-weekly, weekly). In some instances, the business unit database 122 may be a multidimensional database. Accordingly, the information stored within the business unit database 122 may be efficiently organized to accommodate quick retrieval for various customized widgets generated in the performance management application 126, as will be described below.

The input/output circuit 114 is structured to receive communications and/or information from and provide communications and/or information to the user of the business unit computing system 102. In this regard, the input/output circuit 114 is structured to exchange data, communications, instructions, etc. with an input/output component of the business unit computing system 102. Accordingly, in one embodiment, the input/output circuit 114 includes an input/output device. In another embodiment, the input/output circuit 114 includes communication circuitry for facilitating the exchange of data, values, messages, and the like between an input/output device and the components of the business unit computing system 102. In yet another embodiment, the input/output circuit 114 includes machine-readable media for facilitating the exchange of information between an input/output device and the components of the business unit computing system 102. In still another embodiment, the input/output circuit 114 includes any combination of hardware components, communication circuitry, and machine-readable media.

For example, in some embodiments, the input/output circuit 114 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 114 provides an interface for the user to interact with various applications stored on the business unit computing system 102.

The business location computing system 104 may be associated with a particular location of business (e.g., a business location) associated with the business unit associated with the business unit computing system 102. In some instances, there may be a plurality of business location computing systems 104, each in communication with a corresponding business unit computing system 102. The business location computing system 104 (as well as any additional business location computing systems) may be any suitable user computing device. For example, the business location computing system 104 may be a mobile phone, a personal computer (e.g., a desktop computer or a laptop computer), a tablet, a smart watch or other wearable device, or any other suitable user computing device capable of accessing and communicating using local and/or global networks.

The business location computing system 104 similarly includes a network interface circuit 128, a processing circuit 130, and an input/output circuit 132. The network interface circuit 128, the processing circuit 130, and the input/output circuit 132 may function substantially similar to and include the same or similar components as the network interface circuit 110, the processing circuit 112, and the input/output circuit 114 described above, with reference to the business unit computing system 102. For example, the network interface circuit 128 similarly enables the business location computing system 104 to exchange information over the network 108.

Further, the processing circuit 130 similarly includes a processor 134, a memory 136, and a web browser 124. The processor 134 may similarly be implemented as a general-purpose processor, an application specific integrated circuit (ASIC), one or more field programmable gate arrays (FPGAs), a digital signal processor (DSP), a group of processing components, or other suitable electronic processing components. The memory 136 includes one or more memory devices (e.g., RAM, NVRAM, ROM, Flash Memory, hard disk storage, etc.) that store data and/or computer code for facilitating the various processes described herein. That is, in operation and use, the memory 136 stores at least portions of instructions and data for execution by the processor 134 to control the functionality of the processing circuit 130. For example, the memory 118 comprises cache-type memory configured to retrievably store at least portions of instructions and data pertaining to various web-based applications. Moreover, the memory 136 may be or include tangible, non-transient volatile memory or non-volatile memory.

As such, the business location computing system 104 is configured to run a variety of application programs and store associated data in a database of the memory 136. Some of these applications may be network-based or web-based applications (e.g., web applications) provided via the web browser 124, which may be executed remotely from the business location computing system 104 (e.g., by the performance management computing system 106). One such web application may be the performance management application 126 provided by the performance management computing system 106, as will be described below. The performance management application 126 (as well as various other web applications) may include software such as HTML, XML, WML, SGML, PHP (Hypertext Preprocessor), CGI, and like languages. Accordingly, the business location computing system 104 includes software and/or hardware capable of implementing a network-based or web application.

The memory 136 may similarly include a business location database 138. As alluded to above, the business location computing system 104 may be associated with a business location associated with, owned by, and/or operated by the enterprise. In some instances, the business location database 138 may be similarly configured to retrievably store information pertaining to various employees and/or potential employee roles (e.g., job titles). For example, the information may include names, employee roles, calendar information, length of employment, etc. for various employees employed by or associated with the business location and/or the enterprise. In some instances, the information may comprise task-related information and/or performance-related information. For example, the task-related information may include a set of tasks required by a specific employee role. In some instances, the performance-related information may pertain to various employee achievements. In some instances, the information may further include business location information pertaining to the business location associated with the business location computing system 104.

The information stored within the business location database 138 (or elsewhere within the memory 136) may be selectably retrievable by various components of the system 100 (e.g., the business unit computing system 102, the performance management computing system 106) via the network 108 (e.g., using the network interface circuit 110, the network interface circuit 128, and/or the network interface circuit 140). In some instances, the information stored within the business location database 138 may be updated in real-time. In some instances, the information within the business location database 138 may be updated on a specified schedule (e.g., hourly, bi-daily, daily). In some instances, the business location database 138 may be a multidimensional database. Accordingly, the information stored within the business location database 138 may be efficiently organized to accommodate quick retrieval for various customized widgets generated in the performance management application 126, as will be described below.

The input/output circuit 132 is similarly structured to receive communications and/or information from and provide communications and/or information to the user of the business location computing system 104. In this regard, the input/output circuit 132 is structured to exchange data, communications, instructions, etc. with an input/output component of the business location computing system 104. Accordingly, in one embodiment, the input/output circuit 132 includes an input/output device. In another embodiment, the input/output circuit 132 includes communication circuitry for facilitating the exchange of data, values, messages, and the like between an input/output device and the components of the business location computing system 104. In yet another embodiment, the input/output circuit 132 includes machine-readable media for facilitating the exchange of information between an input/output device and the components of the business location computing system 104. In still another embodiment, the input/output circuit 132 includes any combination of hardware components, communication circuitry, and machine-readable media.

For example, in some embodiments, the input/output circuit 132 similarly comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 132 provides an interface for the user to interact with various applications stored on the business location computing system 104.

The performance management computing system 106 may be associated with a performance management enterprise. As alluded to above, the performance management enterprise may be the same enterprise associated with the locations of business and/or the business units described above, with reference to the business location computing system 104 and/or the business unit computing system 102. In some instances, there may be a plurality of business unit computing systems 102 and a plurality of business location computing systems 104, each in communication with the performance management computing system 106.

The performance management computing system 106 may be any suitable user computing device. For example, the performance management computing system 106 may be a mobile phone, a personal computer (e.g., a desktop computer or a laptop computer), a tablet, a smart watch or other wearable device, or any other suitable user computing device capable of accessing and communicating using local and/or global networks.

The performance management computing system 106 similarly include a network interface circuit 140, a processing circuit 142, and an input/output circuit 144. The network interface circuit 140, the processing circuit 142, and the input/output circuit 144 may function substantially similar to and include the same or similar components as the network interface circuit 110, the processing circuit 112, and the input/output circuit 114 described above, with reference to the business unit computing system 102. For example, the network interface circuit 140 similarly enables the performance management computing system 106 to exchange information over the network 108.

Further, the processing circuit 142 includes a processor 146, a memory 148, the performance management application 126, a widget selection circuit 150, a work queuing circuit 152, a cache priority circuit 154, and a web browser 156. The processor 146 may similarly be implemented as a general-purpose processor, an application specific integrated circuit (ASIC), one or more field programmable gate arrays (FPGAs), a digital signal processor (DSP), a group of processing components, or other suitable electronic processing components.

The memory 148 includes one or more memory devices (e.g., RAM, NVRAM, ROM, Flash Memory, hard disk storage, etc.) that store data and/or computer code for facilitating the various processes described herein. That is, in operation and use, the memory 148 stores at least portions of instructions and data for execution by the processor 146 to control the functionality of the processing circuit 142. For example, the memory 118 comprises cache-type memory configured to retrievably store at least portions of instructions and data pertaining to various web-based applications. Moreover, the memory 148 may be or include tangible, non-transient volatile memory or non-volatile memory. As such, the performance management computing system 106 is configured to run a variety of application programs and store associated data in a database of the memory 148. One such application may be the performance management application 126.

The memory 148 may similarly include an enterprise database 158. In some instances, the enterprise database 158 may be similarly configured to receive and retrievably store information pertaining to various employees and/or potential employee roles (e.g., job titles) associated with the business unit computing system 102, the business location computing system 104, and/or the performance management computing system 106. For example, the information may include names, employee roles, calendar information, length of employment, etc. for various employees. In some instances, the information may comprise task-related information and/or performance-related information. For example, the task-related information may include a set of tasks required by a specific employee role. In some instances, the performance-related information may pertain to various employee achievements. In some instances, the information may further include enterprise information pertaining to the enterprise associated with the business unit computing system 102, the business location computing system 104, and/or the performance management computing system 106.

In some instances, the information stored within the enterprise database 158 may be updated in real-time. In some instances, the information within the enterprise database 158 may be updated on a specified schedule (e.g., hourly, bi-daily, daily). In some instances, the enterprise database 158 may be a multidimensional database. Accordingly, the information stored within the enterprise database 158 may be efficiently organized to accommodate quick retrieval for various customized widgets generated in the performance management application 126, as will be described below.

The performance management application 126 is developed, managed, and/or executed by the performance management computing system 106. Accordingly, the performance management application 126 may be downloaded by the performance management computing system 106 prior to its usage or hard coded into the memory 148 of the performance management computing system 106. In some embodiments, the performance management application 126 may be incorporated with an existing application that is developed, managed, and/or executed by the performance management computing system 106 (e.g., a proprietary banking application). In other embodiments, the performance management application 126 is a separate software application that is developed, managed, and/or executed by the performance management computing system 106.

In certain embodiments, the performance management application 126 further includes an application programming interface (API) and/or a software development kit (SDK). For example, the performance management application 126 may include a performance management API that facilitates the receipt and/or transmittal of information pertaining to the performance management system 100. Additionally, the performance management application 126 may include a performance management SDK that facilitates the continuous development and/or modification of application code associated with the performance management application 126.

The performance management application 126 may be selectively accessed and/or run as a web application by various users of the business unit computing system 102, the business location computing system 104, and/or the performance management computing system 106 via the web browser 120, the web browser 124, and/or the web browser 156, respectively. In this regard, at least a portion of the performance management computing system 106 may act as a host server for running, managing, and developing the performance management application 126.

Accordingly, the performance management application 126 may be a network-based or web application. As such, the performance management application 126 may include software such as HTML, XML, WML, SGML, PHP (Hypertext Preprocessor), CGI, and like languages. Specifically, in some instances, the functionality of the performance management application 126 is provided via an object-oriented programming language application code. Accordingly, the performance management computing system 106 includes software and/or hardware capable of implementing and/or supporting a network-based or web application.

In some instances, a user of the business unit computing system 102, the business location computing system 104, and/or the performance management computing system 106 may have to log onto a web-based interface before usage of the application. In this regard, the performance management application 126 may be supported by the performance management computing system 106 and at least portions of the performance management application 126 may only be transmitted for use to the business unit computing system 102, the business location computing system 104, and/or the performance management computing system 106 once a user has been authorized via a login process.

The performance management application 126 is structured to provided displays to a user via the user's web browser (e.g., the web browser 120, the web browser 124, the web browser 156) that enable the user to view, manage, and generate reports on various task-related and/or performance related information pertaining to various employees of the enterprise associated with the business unit computing system 102, the business location computing system 104, and/or the performance management computing system 106.

As such, the performance management application 126 may be communicably coupled with the business unit computing system 102, the business location computing system 104, and the performance management computing system 106. Accordingly, the performance management application 126 may be configured to selectively access information stored within the business unit computing system 102 (e.g., the memory 118), the business location computing system 104 (e.g., the memory 136), and/or the performance management computing system 106 (e.g., the memory 148) to produce and/or generate the various dashboards and widgets described herein.

For example, the performance management application 126 may provide a performance dashboard including a plurality of customizable and selectable widgets. The widgets may be structured as self-contained application objects (e.g., widget application code) that may be customized to contain specific information and/or functionality. The customized widgets may then be placed into a dashboard "framework" (e.g., framework application code) by the user's web browser 120, 124, 156. As such, starting with a "blank" base widget, content therein (e.g., collected or transmitted from the business unit database 122, the business location database 138, and/or the enterprise database 158), the widget size, and the widget location within the performance dashboard may all be customized for a given application or user. Accordingly, new or additional widgets may be created or added to the performance dashboard by developers of the performance management application 126 using a large amount of reused code from a "blank" base widget.

In some instances, the performance management application 126 may be structured such that the framework application code may be transmitted to the user's web browser 120, 124, 156 separate from the widget application code for the various widgets. The framework application code may be sufficiently small (e.g., data-wise) to be stored in cache-type memory associated with the user's computing system (e.g., the business unit computing system 102, the business location computing system 104, the performance management computing system 106). As such, the performance management application 126 may be configured to instruct the user's web browser 120, 124, 156 to store the framework application code within the cache-type memory associated with the user's computing system (e.g., the business unit computing system 102, the business location computing system 104, the performance management computing system 106). Accordingly, browser load time associated with downloading the framework application code from the performance management computing system 106 may be significantly reduced or eliminated upon future startups of the performance management application 126.

Further, the structure of the performance management application 126 may allow for the widget application code associated with each widget to be individually transmitted to the user's web browser 120, 124, 156 and subsequently placed within the framework application code. As will be described below, with respect to the widget selection circuit 150, the performance management application 126 may be configured to provide only predetermined widgets to the user based on their role within the enterprise. Accordingly, only the widget application code for the predetermined widgets may be sent to the user's web browser 120, 124, 156, thereby reducing the total amount of data required to be downloaded while loading the performance management application 126. Specifically, browser load time associated with downloading widget application code of would-be unused widgets' may be significantly reduced or eliminated.

Accordingly, the performance management application 126 is structured such that a lightweight (data-wise) framework application code may be initially downloaded by the user's browser 120, 124, 156. The framework application code may then be "filled in" with various widget application code. However, only the widget application code corresponding to the widgets that are actually meant to be provided and/or displayed to the user is downloaded by the user's browser 120, 124, 156 and added to the framework application code. As such, the structure of the performance management application 126 allows for an efficient loading process by the user's web browser 120, 124, 156, which allows for the various widgets displayed on the performance dashboard of the performance management application 126 to be more responsive as compared to a performance dashboard of an application provided as a single large data file including the framework application code and widget application code for every widget available to the user (including unused widgets).

In some embodiments, the widget application code for each of the various widgets is further structured to allow for real-time communication, which may allow for updates to the information contained within the widgets or to the widgets themselves to be pushed to the user's web browser 120, 124, 156 without interaction from the user (e.g., without the user being required to manually refresh the performance dashboard of the performance management application 126). Because the widget application code associated with each widget may be individually transmitted to the user's web browser 120, 124, 156, and each widget is structured as a self-contained object (e.g., the widget application code is essentially its own miniature application), various updates and changes to individual widgets may be made and pushed to the user's web browser 120, 124, 156 without the possibility of affecting the framework application code or the widget application code of other widgets. Further, because of the structure of the performance management application 126 (e.g., because the widget application code associated with each widget may be individually added or removed from the framework application code), developers can easily modify the widget application code of various widgets, verify that any modifications and/or edits function properly in an offline development site having an identical framework application code, and then plug those modified widgets into the real performance dashboard provided to the user by the performance management application 126.

Additionally, because each of the widgets may be updated in real time, the various widgets may effectively "communicate" between themselves. That is, in some instances, completion of a first task in a first widget may result in a prompt for the user to perform a second task in a second widget. Then, completion of the second task in the second widget may result in a prompt for the user to perform a third task in the first widget or a third widget.

As alluded to above, the various widgets may be customized to provide various desired and/or necessary information to the user. Various exemplary widgets will be discussed below, with respect to FIGS. 2-11. In any case, the various widgets may be populated using information collected and/or retrieved from the business unit computing system 102 (e.g., the business unit database 122), the business location computing system 104 (e.g., the business location database 138), and/or the performance management computing system 106 (e.g., the enterprise database 158). In some instances, the various widgets may be populated using the same or similar information. Accordingly, in some instances, the various widgets (e.g., the corresponding widget application code associated with the various widgets) may be structured to allow for interaction and/or sharing of information, such that the same information doesn't need to be redundantly retrieved for each widget.

Each of the customizable and selectable widgets may further be automatically tailored to the user based on their role (e.g., position) within the enterprise by the widget selection circuit 150. Specifically, the widget selection circuit 150 is configured to determine the user's role within the enterprise and to modify and/or select the widgets provided to the user via the performance dashboard of the performance management application 126. For example, the widget selection circuit 150 may correlate the user's login information to the user's identity, including their role within the enterprise, by retrieving the necessary information from at least one of the databases 122, 138, 158. The widget selection circuit 150 may then select specific widgets to provide to the user based on their role within the enterprise. Accordingly, in some instances, different widgets and/or different information contained within corresponding widgets may be provided to different users based on their role or level within the enterprise.

For example, in some instances, an employee's responsibilities, data access rights, application access rights, human resource information (e.g., calendar information, paid time-off information, efficiency information), productivity/performance information, etc., may each be displayed in various customizable widgets that correspond to the particular role of the employee using the performance management application 126. That is, for example, in some instances, only employees having a managerial role may have access to first information, only employees having a human resource role may have access to second information, only employees having an executive role may have access to third information, etc. In some instances, the first information, second information, third information, etc., may be different from each other, as desired for a given scenario. In some instances, the first information, second information, third information, etc., may overlap (e.g., include the same or similar information), as desired for a given scenario.

The widget selection circuit 150 may further determine the user-specific information for populating each selected widget. The user-specific information may be determined, in part, based on the user's role within the enterprise. In some instances, the amount of information provided to the user may be hierarchically selected by the widget selection circuit 150, based on the role of the user within the enterprise. For example, a banker at a first business location may receive information pertaining to them self, as well as comparative information regarding various other bankers at their same level within the enterprise. A team manager of the first business location may receive information pertaining to them self, information pertaining to each banker on their team, and comparative information regarding various other team managers at their same level within the enterprise. A business unit leader of several business locations, including the first business location, may receive information pertaining to them self, information pertaining to each team manager they oversee, information pertaining to each banker on each of their team managers' teams, as well as comparative information regarding various other business unit leaders at their same level within the enterprise. As such, the user may receive different amounts of information based on their role within the enterprise. In some instances, the same widget may be provided to users of varying roles within the enterprise, but may include more or less information based on each user's role within the enterprise.

Additionally, in some instances, the widget selection circuit 150 may be configured to allow a user to be proxied into another user's performance dashboard. That is, a first user may be authenticated and approved through a login and/or authentication process to view and/or interact with a second user's performance dashboard. That is, the first user may log into the performance management application 126 and indicate that they would like to view the second user's performance dashboard and, upon authentication and approval, the widget selection circuit 150 may modify and/or select the widgets provided to the first user's performance dashboard to reflect the information and widgets that would be provided to the second user. This may allow for the first user (e.g., a team manager at a first business location) to cover for the second user (e.g., a team manager at a second business location) while they are out of the office or otherwise unavailable.

The work queuing circuit 152 is structured to allow for a user or developer of the performance management computing system 106 to selectively view and manage various computational tasks associated with the performance dashboard and widgets of the performance management application 126. For example, the performance management application 126 is provided to the business unit computing system 102 (e.g., via the web browser 120), the business location computing system 104 (e.g., via the web browser 124), and/or the performance management computing system 106 (e.g., via the web browser 156) as a web-based application. Accordingly, application code associated with the performance management application 126 must be received and loaded by the corresponding web browser 120, 124, 156, to generate the performance dashboard associated with the performance management application 126. The performance management application 126 may specifically comprise associated object-oriented programming code.

The code may be handled in a single threaded manner. That is, upon running the program, a browser (e.g., the web browser 120, the web browser 124, or the web browser 156) does one computational task at a time in a sequential fashion. This traditionally works well for pages (e.g., web pages, web-based application pages) with little processing requirements upon loading. That is, in many cases, users may not notice delays in web pages associated with various pieces of the corresponding web page loading. In some cases, users may notice a short delay, but may simply accept that a web page will generally take a few seconds to load.

However, in instances where a webpage requires the loading, processing, and/or management of large amounts of data (e.g., hundreds of megabytes of data), the time associated with performing the necessary loading, processing, and/or management of the data can take as long as 10 seconds, 20 seconds, 30 seconds, or even more. Because of the web browser's single-threaded nature (i.e., the single-threaded nature of an object-oriented programming language), the browser window may stay frozen and non-responsive for users while the page is loading. Commercial websites and/or third party browser-type business applications have traditionally attempted to compensate for this by graying out portions of the webpage and/or showing various loading graphics to keep users, who may not realize the webpage is still loading, from attempting to interact with the webpage.

Conversely, the work queuing circuit 152 allows for the performance management application 126 to appear as though it is running on multiple threads within the user's web browser 120, 124, 156. That is, the work queuing circuit 152 allows for various preferred widgets and dashboard elements to be immediately responsive (or sufficiently responsive, as will be described below) to user input within the user's web browser 120, 124, 156, even while various remaining portions of the performance dashboard continue to load additional data from the performance management computing system 106.

Specifically, the work queuing circuit 152 is structured to allow a user or developer of the performance management application 126 (e.g., using the performance management computing system 106) to manage the workload provided to the corresponding web browser 120, 124, 156 (e.g., computational tasks and computational task size), such that the web browser 120, 124, 156 may remain sufficiently responsive to user input. Sufficient responsivity may be determined or set by the user or developer of the performance management application 126, as will be discussed below.

For example, the work queuing circuit 152 determines, manages, and monitors a list of computational tasks associated with generating and operating the performance dashboard of the performance management application 126. The work queuing circuit 152 further monitors the amount of time each computational task takes to execute. This information is then provided to the user or developer via a work queuing widget 1000 (shown in FIG. 10).

In some embodiments, the work queuing circuit 152 (e.g., via the work queuing widget) may be used to identify and selectively separate or split large, time-consuming computational tasks into smaller sub-tasks to expedite load time and responsiveness. For example, a user or developer may set a load time threshold for the computational tasks associated with the performance management application 126 to ensure that the performance management application 126 is sufficiently responsive, as determined by the user or developer. Sufficient responsivity may, for example, mean that the performance management application 126 is responsive within a few hundredths of a second (e.g., one hundredth, two hundredths, three hundredths) or a few tenths of a second (e.g., one tenth, two tenths, three tenths).

For example, in some embodiments, to ensure that the performance management application 126 is sufficiently responsive, the user may provide a load time threshold of between one hundredth of a second and three hundredths of a second. In some embodiments, the user may provide a load time threshold of between one tenth of a second and three tenths of a second. Computational tasks that exceed the load time threshold (hereinafter referred to as "unacceptably large computational tasks") may then be identified within the work queuing widget. For example, in some instances, the unacceptably large computational tasks may be indicated via bolding, coloring, or any other suitable indication style. In some other instances, the user or developer may simply view the amount of time associated with each computational task and identify the unacceptably large computational tasks manually.

For purpose of illustration only, in one example, a load time for each computational task is calculated (e.g., as each computational task is queued, as each computational task begins executing). The load time may include the duration of time it takes a specific computational task to execute. Each load time is then compared to the load time threshold. If the load time exceeds the load time threshold (i.e., the load time is greater than the load time threshold), the computational task is identified (e.g., flagged) as an unacceptably large computational task. In some instances, this analysis may be performed prior to determining the list of computational tasks for execution. In some other instances, this analysis may be performed while the computational tasks are being executed to further improve response time.

Once the user or developer has identified the unacceptably large computational tasks, the user or developer may then edit or revise the application code for that particular computational task to redesign it into multiple smaller computational tasks. The user or developer may then replace the unacceptably large computational task with the multiple smaller computational tasks within the application code. Because the browser (e.g., running an object-oriented programming language) functions by running a single scheduled computational task and then checking for and responding to any user input commands before going on to any subsequently scheduled tasks, breaking the unacceptably large computational tasks into multiple smaller computational tasks allows for the browser to remain sufficiently responsive, thereby giving the appearance that the browser is doing other work (e.g., loading other portions or widgets of the performance dashboard) in a multi-threaded parallel fashion.

In some instances, the work queuing circuit 152 further allows for the selective prioritization of various computational tasks. In some embodiments, this prioritization may be, for example, selectable by the user or developer. For example, a user may indicate or select preferred widgets and/or other dashboard elements to be prioritized during operation (e.g., generation, loading, startup) of the performance dashboard generated by the performance management application 126. The computational tasks associated with the preferred widgets and/or other dashboard elements may then be prioritized while loading or generating the performance dashboard to ensure that the user's preferred widgets and/or other dashboard elements are made responsive (e.g., fully loaded) as quickly as possible.

In some embodiments, the prioritization of the various computational tasks may additionally or alternatively be automatically prioritized based on user tendencies. For example, the performance management computing system 106 may be configured to monitor and store dashboard use data (e.g., in the memory 148). The dashboard use data may pertain to the use of the various widgets and/or other dashboard elements by various users. As such, the work queuing circuit 152 may be configured to prioritize the computational tasks associated with generating the performance dashboard for the user of the performance management application 126 based on which widgets and/or other dashboard elements are most frequently used by the user or similar types of users (e.g., having similar employment roles or responsibility levels).

For example, if the performance management computing system 106 is being accessed by a user who is a manager at a customer service call center of the enterprise associated with the business unit computing system 102 or the business location computing system 104, the work queuing circuit 152 may prioritize the various computational tasks based on corresponding dashboard use data pertaining to the user and/or other managers at customer service call centers.

Accordingly, the work queuing circuit 152 may allow for the performance dashboard generated by the performance management application 126 to load preferred widgets and/or other dashboard elements first (e.g., before less important widgets/dashboard elements), thereby allowing for the generated performance dashboard to be more quickly responsive to user input. The user may further selectively update and/or modify preferences to ensure that preferred widgets and functionalities are responsive as soon as possible.

As such, the work queuing circuit 152 may allow for both the prioritization of preferred widgets and/or other dashboard elements and the efficient identification and modification of unacceptably large computational tasks into multiple smaller computational tasks, such that the performance dashboard of the performance management application 126 may be sufficiently responsive to user interaction.

The work queuing circuit 152 may additionally be configured to continuously monitor the amount of time associated with each computational task performed while generating the performance dashboard of the performance management application 126. In some instances, the work queuing circuit 152 may be configured to automatically switch between computational tasks if a particular computational task is taking too long. For example, in some instances, the work queuing circuit 152 may include a predefined task postponement time threshold. If the work queuing circuit 152 determines that a particular computational task has exceeded the predefined task postponement time threshold, the work queuing circuit 152 may be configured to temporarily skip that computational task and switch to the next computational task to be performed. The work queuing circuit 152 may then perform the computational task that exceeded the predefined task postponement time threshold once it has performed each of the remaining computational tasks associated with generating the performance dashboard of the performance management application 126.

The cache priority circuit 154 may be structured to allow a user or developer to manage server-side caching of the various information used within the performance management application 126. For example, while generating the performance dashboard and widgets of the performance management application 126, various information may be retrieved from the various databases (e.g., the business unit database 122, the business location database 138, the enterprise database 158) and incorporated into the performance dashboard and/or widgets provided to the corresponding web browser 120, 124, 156 being used to access the performance management application 126. However, instead of simply retrieving information from the pertinent business unit database 122, 138, 158 each time a performance dashboard and/or widget requires the information, the performance management computing system 106 is configured to perform server-side caching by storing various information within the cache-type memory of the memory 148 for a more efficient retrieval process.

The cache priority circuit 154 may allow for a user or developer to manage various caching priority rules. For example, the user or developer may create caching priority rules to store information pertaining to various employees within the cache-type memory of the memory 148 to be used when creating the performance dashboard and/or widgets for managers and/or business unit leaders associated with those employees.

For example, in some instances, a banker at a first business location associated with a first business location computing system 104 may access the performance management application 126 using the web browser 124. In this example, the performance management application 126 may retrieve various information from the business location database 138 pertaining to the banker to incorporate into the various widgets of the dashboard provided to the web browser 124. However, the cache priority circuit 154 may store this information within the cache-type memory of the memory 148 and link the information to the banker's profile.

Next, a team manager of the first business location associated with the first business location computing system 104 may access the performance management application 126 using the web browser 124 of the first business location computing system 104. The performance management application 126 may be configured to provide the team manager with the same or substantially similar information pertaining to the banker, as well as information pertaining to various other bankers working under the team manager and information pertaining to the team manager them self. As such, instead of requiring the information pertaining to the banker to be redundantly retrieved from the business location database 138, the information pertaining to the banker may be quickly retrieved from the cache memory of the memory 148, such that only the information pertaining to the team manager and the additional bankers must be retrieved from the business location database 138. Similarly, the cache priority circuit 154 may store all of this information within the cache-type memory of the memory 148 and link the information to the team manager's profile.

Next, a business unit leader associated with the first business location, as well as various other business locations, may access the performance management application 126 using the web browser 120 of the business unit computing system 102. The performance management application 126 may be configured to provide the business unit leader with the same or substantially similar information pertaining to the banker, the various other bankers, and the team manager of the first business location, as well as information pertaining to bankers and team managers from various other business locations and information pertaining to the business unit leader them self. Again, instead of requiring the information pertaining to the bankers and the team manager of the first business location to be redundantly retrieved from the corresponding business location database 138, the information pertaining to the bankers and the team manager of the first business location may be quickly retrieved from the cache memory of the memory 148, such that only the information pertaining to the various other business locations (e.g., pertaining to the corresponding bankers and team managers) must be retrieved from the corresponding business location databases 138.

As such, the cache priority circuit 154 may allow for aggregated and consolidated information pertaining to varying levels of employees to be quickly delivered to the user based upon, in part, their role within the enterprise. In some instances, the cache priority circuit 154 may be configured to store the various information pertaining to each employee separately within the cache-type memory of the memory 148 of the performance management computing system 106. As such, upon request from the user (e.g., when loading the user's dashboard), the employees (e.g., the user and any employees associated with or overseen by the user) may be quickly correlated to their corresponding information, which may then be used to populate the various widgets of the dashboard of the performance management application 126.

The input/output circuit 144 is similarly structured to receive communications and/or information from and provide communications and/or information to the user of the performance management computing system 106. In this regard, the input/output circuit 144 is structured to exchange data, communications, instructions, etc. with an input/output component of the performance management computing system 106. Accordingly, in one embodiment, the input/output circuit 144 includes an input/output device. In another embodiment, the input/output circuit 144 includes communication circuitry for facilitating the exchange of data, values, messages, and the like between an input/output device and the components of the performance management computing system 106. In yet another embodiment, the input/output circuit 144 includes machine-readable media for facilitating the exchange of information between an input/output device and the components of the performance management computing system 106. In still another embodiment, the input/output circuit 144 includes any combination of hardware components, communication circuitry, and machine-readable media.

For example, in some embodiments, the input/output circuit 144 similarly comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 144 provides an interface for the user to interact with various applications (e.g., the performance management application 126) stored on the performance management computing system 106.

Referring now to FIGS. 2-10, various user interfaces displayable on the business unit computing system 102, the business location computing system 104 and/or the performance management computing system 106 via the performance management application 126 are shown, according to an example embodiment. The user interfaces can be generated based on processes performed by the processing circuit 112 of the business unit computing system 102 (e.g., via the web browser 120), the processing circuit 130 of the business location computing system 104 (e.g., via the web browser 124), and/or the processing circuit 142 of the performance management computing system 106 (e.g., via the web browser 156).

Figure 2:
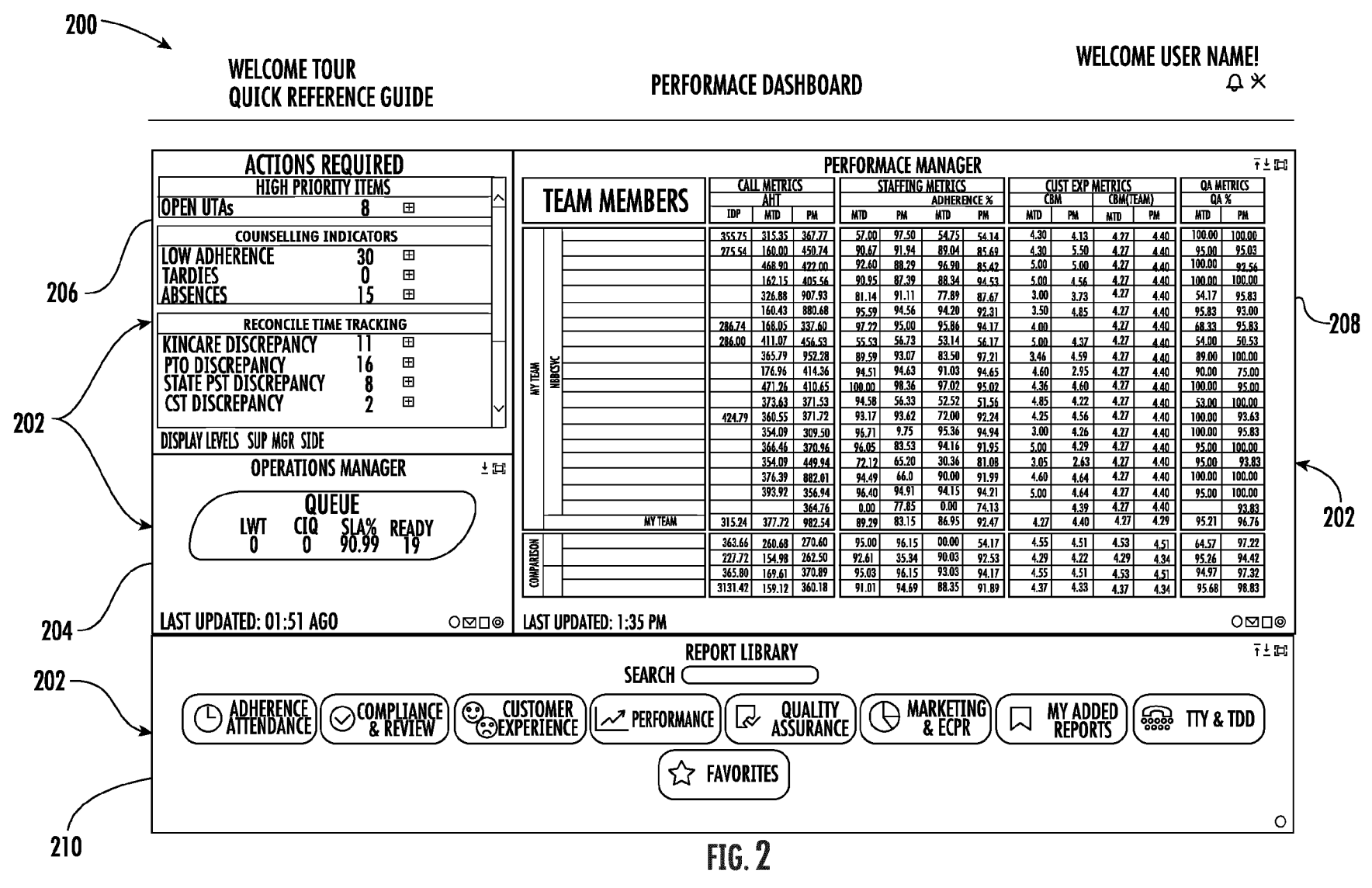

Referring now to FIG. 2, in some embodiments, the performance management application 126 is configured to provide a performance dashboard 200. The performance dashboard 200 may have a plurality of customizable widgets 202. For example, the performance dashboard 200 may include an operations manager widget 204, an actions required widget 206, a performance manager widget 208, and a report library widget 210. In some instances, the plurality of customizable widgets 202 may include various default widgets, based on the user's role within the enterprise. As such, different customizable widgets 202 may be included with the performance dashboard 200 based upon the user's role within the enterprise. Further, various widgets may be selectively added or removed by the user of the performance management application 126. It will be appreciated that various widgets not depicted on the performance dashboard 200 may be added, as desired, for a given user. Various examples of additional widgets will be described below, with reference to FIGS. 6-8 and 10. Moreover, as previously discussed herein, customizable widget 202 placement may be movable (e.g., by a user or developer) within the performance dashboard 200. For instance, customizable widgets 202 may be movable and rearrangeable by way of a drag and drop operation. While FIG. 2 illustrates one possible arrangement of customizable widgets 202 within the performance dashboard 200, in various other examples the customizable widgets 202 may be arranged in other layouts.

The operations manager widget 204 may include a graphic pertaining to various operational information associated with a particular business unit or business location (e.g., associated with the business unit computing system 102, the business location computing system 104, and/or the performance management computing system 106). The operational information may comprise various status-related information and/or operation completion or adherence percentages.

As shown in FIG. 3, the actions required widget 206 may include a list of action items 302 and a display level selection field 304. The action items 302 may be separated into various task categories 306. The task categories may include, for example, high priority items, counselling items, reconciliation items, resource planning items, and miscellaneous other items. Each action item 302 of the list of action items 302 may further be selectively expandable to allow the user to get more detailed information pertaining to the corresponding action item. Once expanded, the user may check the action items 302 off as completed once they have been addressed.

The display level selection field 304 may include a plurality of information level buttons 308, which allow a user to toggle between various levels of information. For example, a business unit leader may click on selected information level buttons 308 to view action items pertaining to themself, action items pertaining to various team managers that the business unit leader oversees, and/or action items pertaining to individual team employees overseen by various team managers that the business unit leader oversees.

The actions required widget 206 may be configured to automatically update and/or refresh to deliver timely notifications to the user about items that require their attention and action. For example, the performance management application 126 may be configured to continuously or periodically retrieve various task-related information, such that the actions required widget 206 may automatically account for tasks completed or needing to be addressed throughout the system 100. The actions required widget 206 further provides a quick reference for the user, thereby removing the need for the user to review a full report on outstanding action items. The actions required widget 206 may further provide links that allow the user to interact with various systems of the enterprise associated with the business unit computing system 102, the business location computing system 104, and/or the performance management computing system 106 to take necessary actions and/or retrieve any additional necessary information. The actions required widget 206 may further include links (not shown) to any applicable reports that may provide additional details, if desired.

Figure 4:
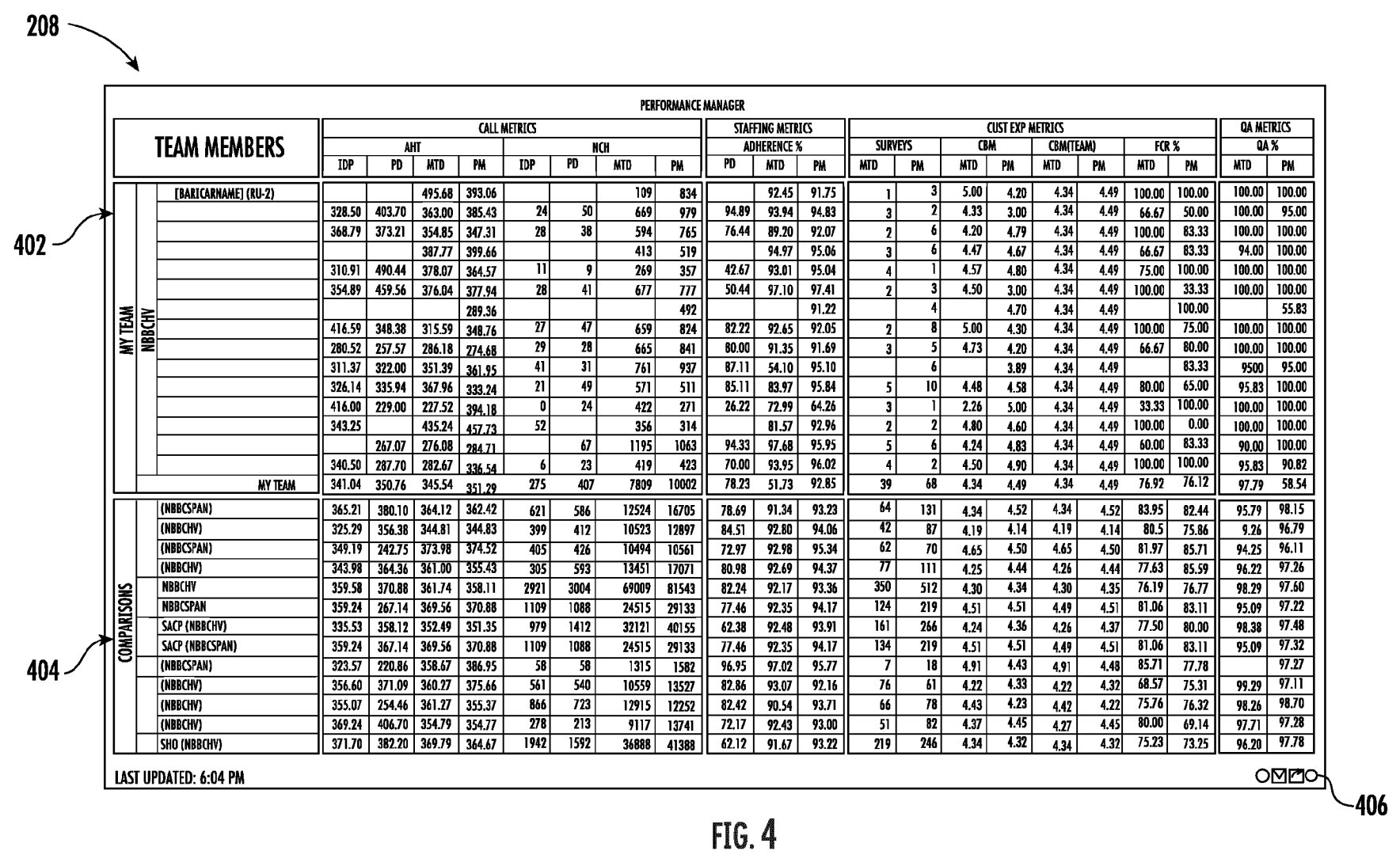

Referring now to FIG. 4, the performance manager widget 208 may be populated with current and/or historical performance information corresponding to the employees or team members that report to the user accessing the performance management application 126. This performance information may be specifically tailored to and used by the user to aid in the effective management of the employees that report to them. For example, in some embodiments, the performance manager widget 208 may include a team members field 402 and a performance comparison field 404. The team members field 402 may provide performance insight for each of the team members that report to the user. The performance comparison field 404 may provide aggregated performance comparisons to the user that are applicable for their team, business location, business unit, etc.

The user may further select and/or customize the information displayed within the performance manager widget 208 by clicking on a settings button 406. Clicking the settings button 406 may provide options for allowing the user to add/remove information, change the selected time frames, and/or add/remove various comparisons to/from the performance manager widget 208. For example, in addition to the team members field 402 and the performance comparison field 404, the user may select to view a training classes field including information pertaining to which employees are in various training classes, a site-specific field including aggregated performance information pertaining to each employee associated with the user's site (e.g., particular team or business unit), and/or various other fields including various other information, as desired by the user.

Accordingly, the performance manager widget 208 provides a quick reference location for managers, supervisors, team leads, etc. to view their team's performance, thereby reducing the time associated with accurately assessing various employees' performance metrics. The performance manager widget 208 may further provide an accurate comparison between employees and teams to further aid in the management of various employees and teams (e.g. associated with the business unit computing system 102, the business location computing system 104, and/or the performance management computing system 106).

Figure 5A:
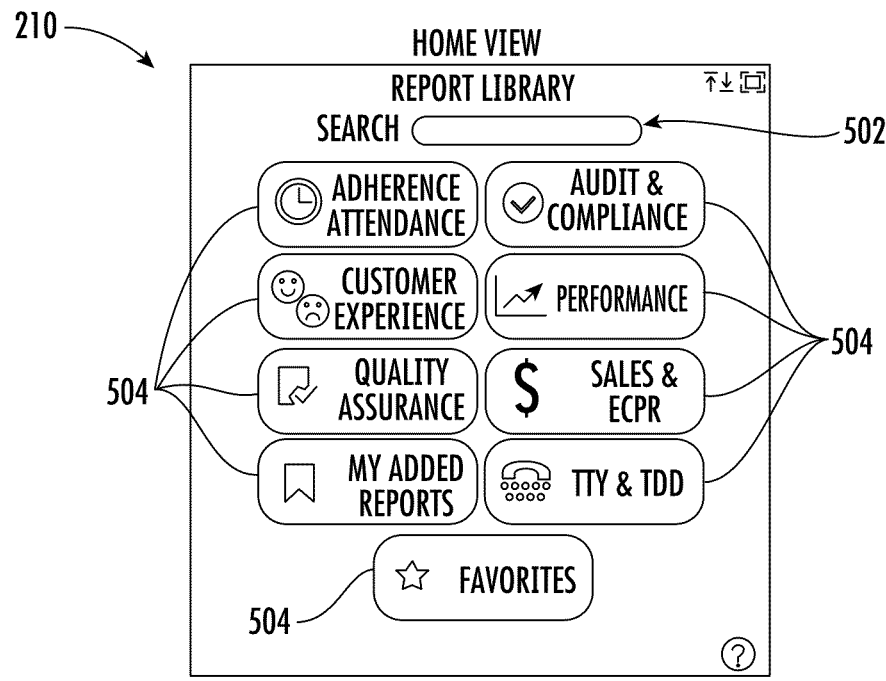
FIG. 5A is a report library widget provided by the performance management application, according to an example embodiment.
Figure 5B:
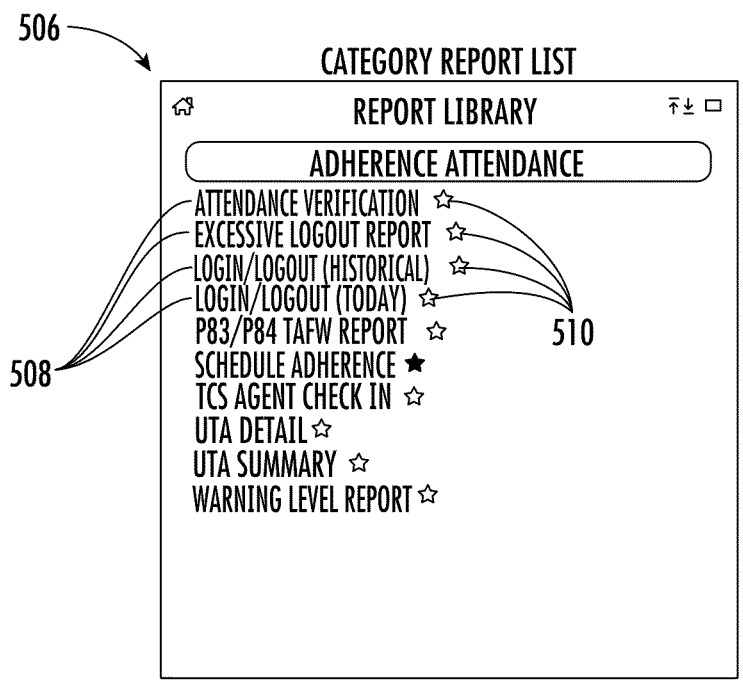
FIG. 5B is a report list window provided by the performance management application, according to an example embodiment.

Referring now to FIGS. 5A and 5B, the report library widget 210 provides a centralized reporting widget that allows for a user to quickly find and utilize various desired reports. The report library widget 210 includes a report search field 502 and a plurality of report category buttons 504. The report search field 502 allows for a user to search for a specific report by name. The plurality of report category buttons 504 may be configured to navigate the user to a list of reports related to the selected category button 504. Various report category buttons 504 may be automatically provided to a user based on their role within the enterprise and dashboard use data retrieved by the various databases 122, 138, 158. That is, various report category buttons 504 provided to the user via the report library widget 210 are targeted or tailored to the user based on their role within the enterprise. Thus, the user may quickly find desired reports without having to sift through various reports that do not pertain to them. The user may also update, add, and/or remove various report category buttons 504 from the report library widget 210, as desired.

As shown in FIG. 5B, once the user has clicked on a selected category button 504, the user is navigated to a report list window 506. The report list window 506 includes a plurality of reports 508. The user may then select any of the plurality of reports 508 to view and/or use as necessary. The user may further choose to select a specific report as a "favorite" report by clicking a corresponding favorite button 510 to ensure the report is readily available in the future.

Figure 6:
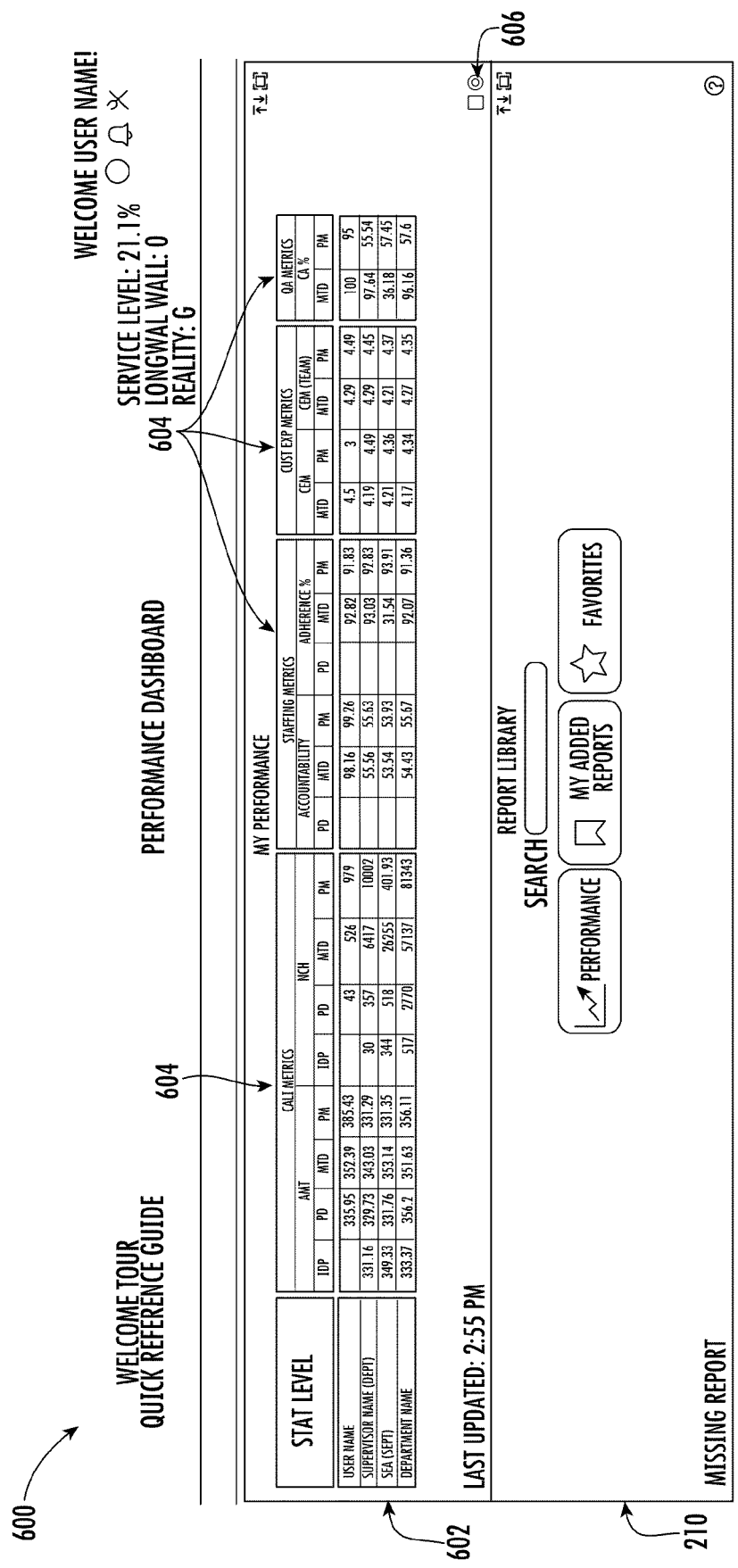
FIG. 6 is another performance dashboard provided by the performance management application including a self-evaluation widget and shown on the user interface, according to an example embodiment.

Referring now to FIG. 6, another performance dashboard 600 is shown. The performance dashboard 600 may be, for example, provided to a banker at a business location. The performance dashboard 600 includes the report library widget 210, as well as a self-evaluation ("My Performance") widget 602. The self-evaluation widget 602 may include various information categories 604 containing a variety of information pertaining to the user. Similar to the performance manager widget 208 discussed above, the user may further select and/or customize the information displayed within the self-evaluation widget 602 using a settings buttons 606 to allow for the user to add/remove information, change the selected time frames, and/or add/remove various comparisons.

Figure 7:
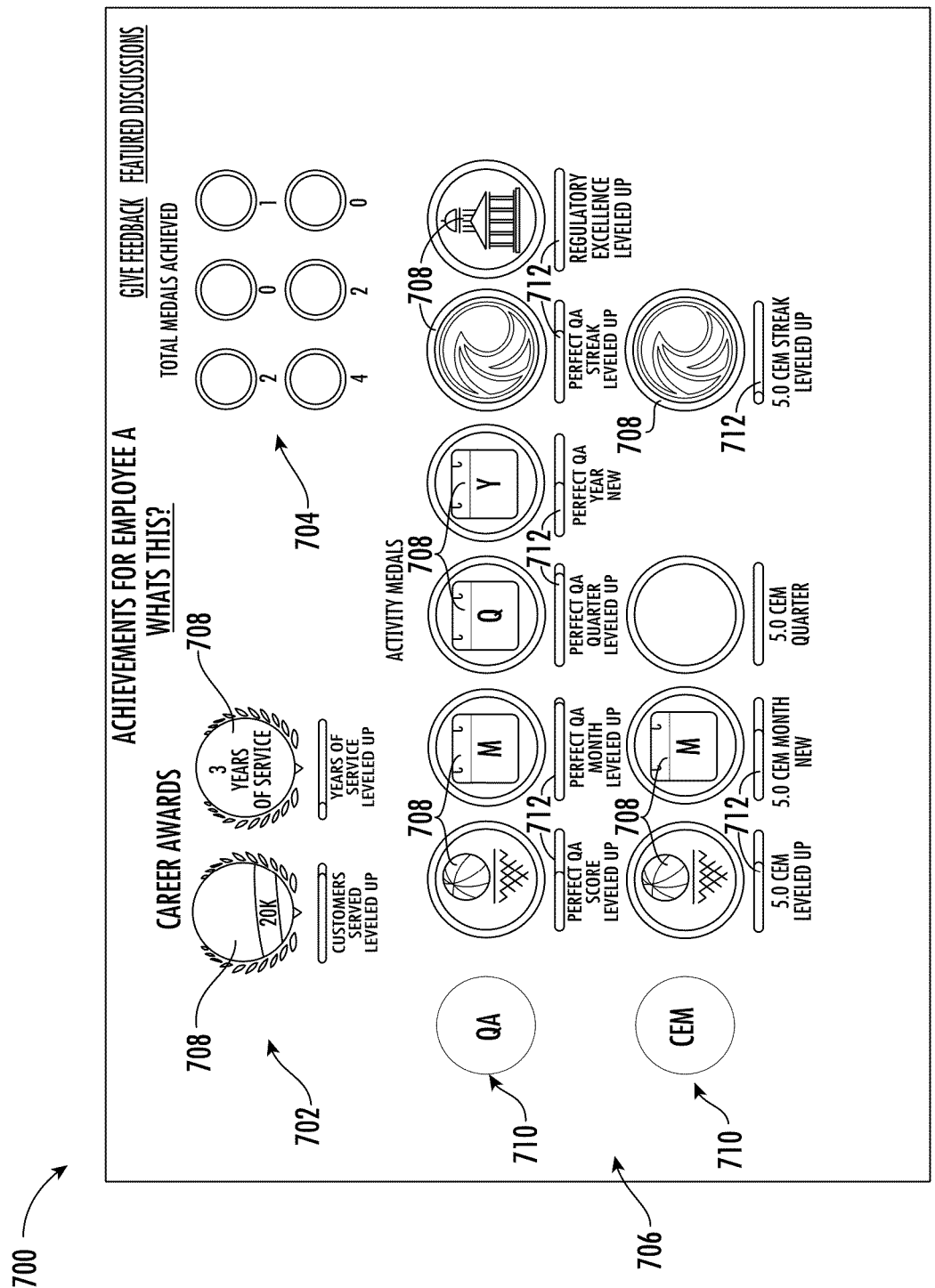
FIG. 7 is a personal achievements widget provided by the performance management application, according to an example embodiment.

Referring now to FIG. 7, a personal achievements widget 700 is shown. The personal achievements widget 700 is configured to notify team members when they have accomplished various work-related achievements through use of various graphically-depicted trophies or medals. Trophies and/or medals may be earned by various employees of the enterprise associated with the business unit computing system 102, the business location computing system 104, and/or the performance management computing system 106. For example, employees may earn medals when they perform various achievements (e.g., exceed a threshold number of customers served, exceed a predetermined number of years of service, exceed a threshold length of maintaining quality assurance). Various medals may further have corresponding levels that the employee may surpass. For example, a bronze medal may be awarded when an employee successfully serves one hundred customers. The bronze medal may then be upgraded to a silver medal once the employee has successfully served five hundred customers. Each category of medal may thus have several corresponding levels associated therewith.

Accordingly, the personal achievements widget 700 may include a career awards field 702, an activity medals field 704, and a total medals achieved field 706. The career awards field 702 and the activity medals field 704 may each include various medals 708 that the user has earned. For example, the career awards field 702 may include the highest level medals 708 that the user has earned throughout their career. Accordingly, if the user (e.g., an employee) switches roles within the enterprise associated with the business unit computing system 102, the business location computing system 104, and/or the performance management computing system 106, a prospective business group or unit may quickly view the highest level awards (e.g., medals 708) earned by the user throughout their career. Additionally, the user may quickly present their highest level awards to their superiors during various review periods to aid in promotion determinations.

The activity medals field 704 may include a list of the various medals 708 the employee has earned, sorted into various medal families 710 that are related (e.g., have a common measurement of success). Each medal 708 may further include a progress bar 712 configured to indicate the user's progress toward the next medal level for the corresponding medal 708. In some instances, in addition to or alternative to the progress bars 712, each medal 708 may include progress stars (not shown). For example, each medal 708 may include four stars that are sequentially filled in when the user has reached, for example, 25%, 50%, 75%, and 100% progress toward the next medal level.

The total medals achieved field 706 may provide an overview of the various amounts of awards of differing levels the employee has received throughout their career. That is, the total medals achieved field 706 may show the total number of medals earned at each accomplishment level.

Figure 8:
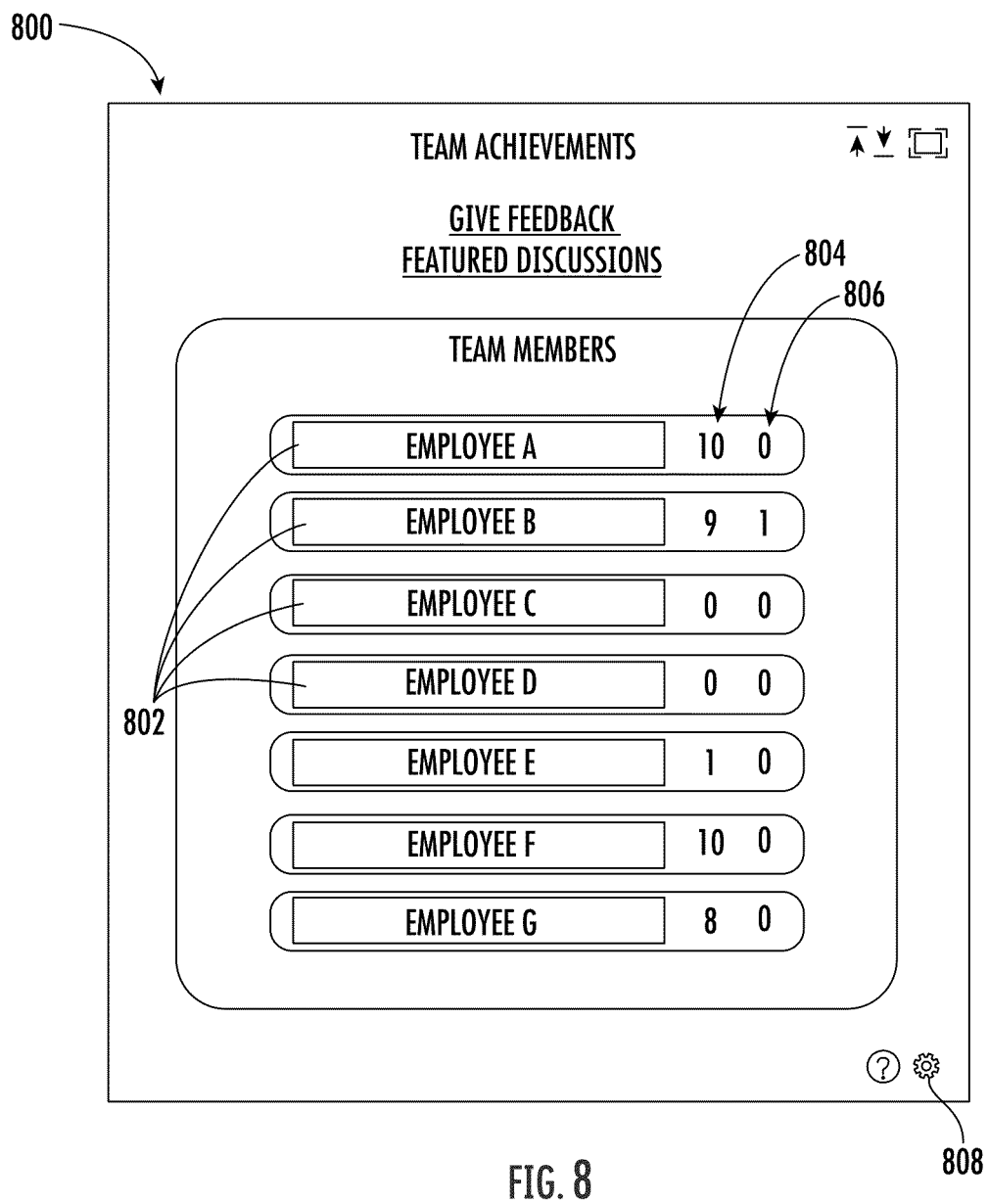
FIG. 8 is a team achievements widget provided by the performance management application, according to an example embodiment.

Referring now to FIG. 8, a team achievements widget 800 is shown. The team achievements widget 800 is configured to allow a user (e.g., a manager or business unit leader) to quickly view and respond to various achievements accomplished by members of their team. In some instances, the team achievements widget 800 may similarly be included in the performance dashboard 200 discussed above. The team achievements widget 800 includes a list of team members 802, each having a corresponding non-dismissed achievements number 804 and a corresponding recent achievements number 806. Within the team achievements widget 800, each team member 802 of the list of team members 802 may be linked, such that the manager or business unit leader may click on the linked team member 802 to view individual achievements for that particular team member 802 (e.g., in a window similar to the personal achievements widget 700 shown in FIG. 7). The non-dismissed achievements number 804 may correspond to the number of new achievements the corresponding team member 802 has not yet dismissed. The recent achievements number 806 may correspond to the number of new achievements the team member 802 has made within a predetermined length of time. For example, the user may customize the team achievements widget 800 by clicking on a settings button 808 of the team achievements widget 800. The settings button 808 may allow for the user to set the predetermined length of time (e.g., today, in the last two days, in the last week).

Accordingly, the team achievements widget 800 may allow for a user (e.g., a manager or business unit leader) to quickly view and assess any achievements that their employees have accomplished. The user may check the team achievements widget 800 daily, weekly, monthly, etc., thereby allowing for the user to easily view and acknowledge their employees' achievements on a regular basis.

Figure 9:
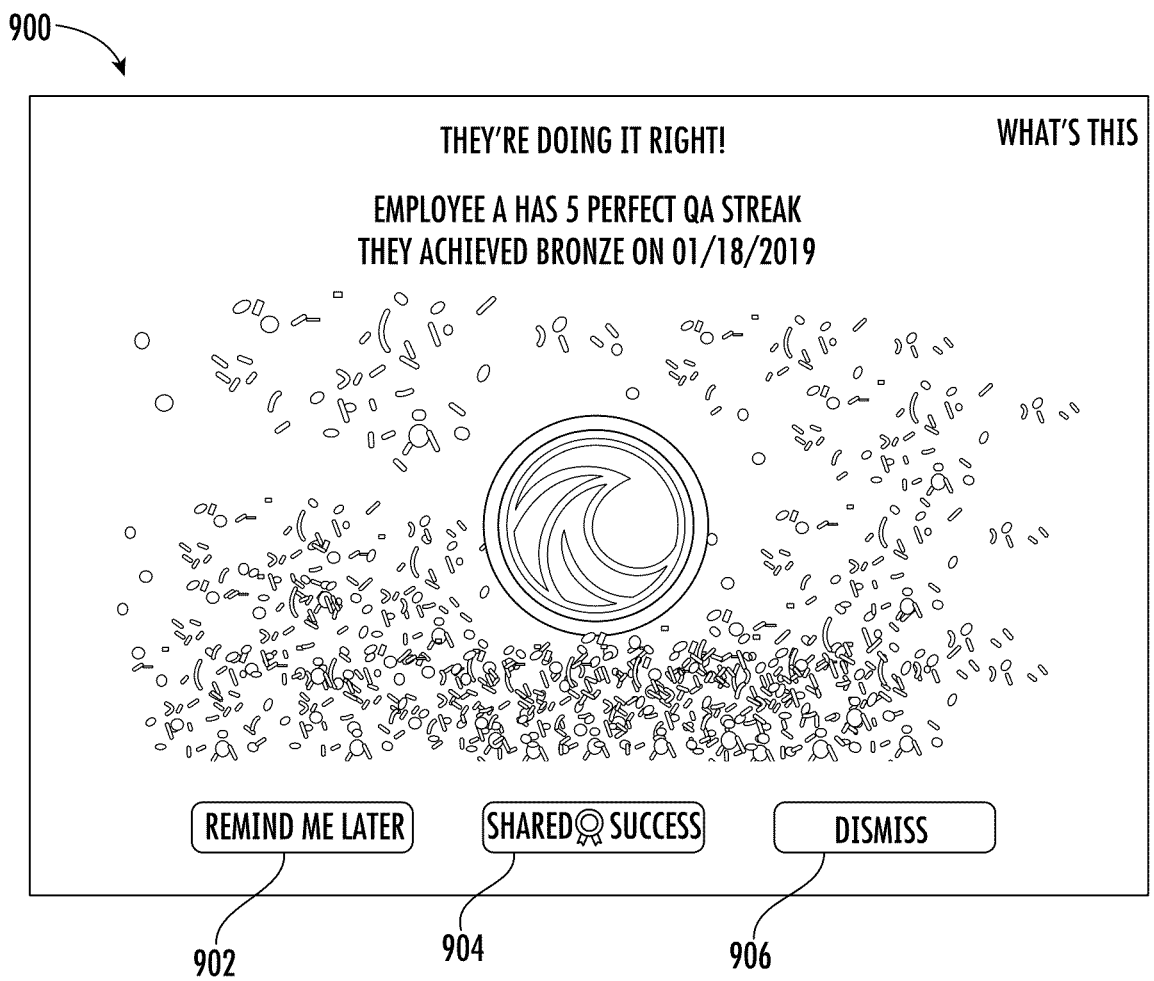
FIG. 9 is an achievement notification provided by the performance management application, according to an example embodiment.

Furthermore, with reference to FIG. 9, the user (e.g., a manager or business unit leader) may receive an achievement notification 900 when a team member accomplishes a new achievement. The achievement notification 900 may include an indication of which team member achieved a new accomplishment, what that accomplishment was, what level medal they received, and the date on which they received their medal. Accordingly, the achievement notification 900 may further encourage the manager or business unit leader to acknowledge their employees' success. The achievement notification 900 may include a reminder button 902, a shared success button 904, and a dismiss button 906. The user may click on the reminder button 902 to close the achievement notification 900 and have the achievement notification 900 pop up again at a later time. The user may click on the shared success button 904 to send the team member who achieved a new accomplishment an acknowledgement or nomination. For example, the user may be a manager or business unit leader who may nominate the team member for additional acknowledgement within the enterprise. The user may click on the dismiss button 906 to simply close the achievement notification 900.

Figure 10:
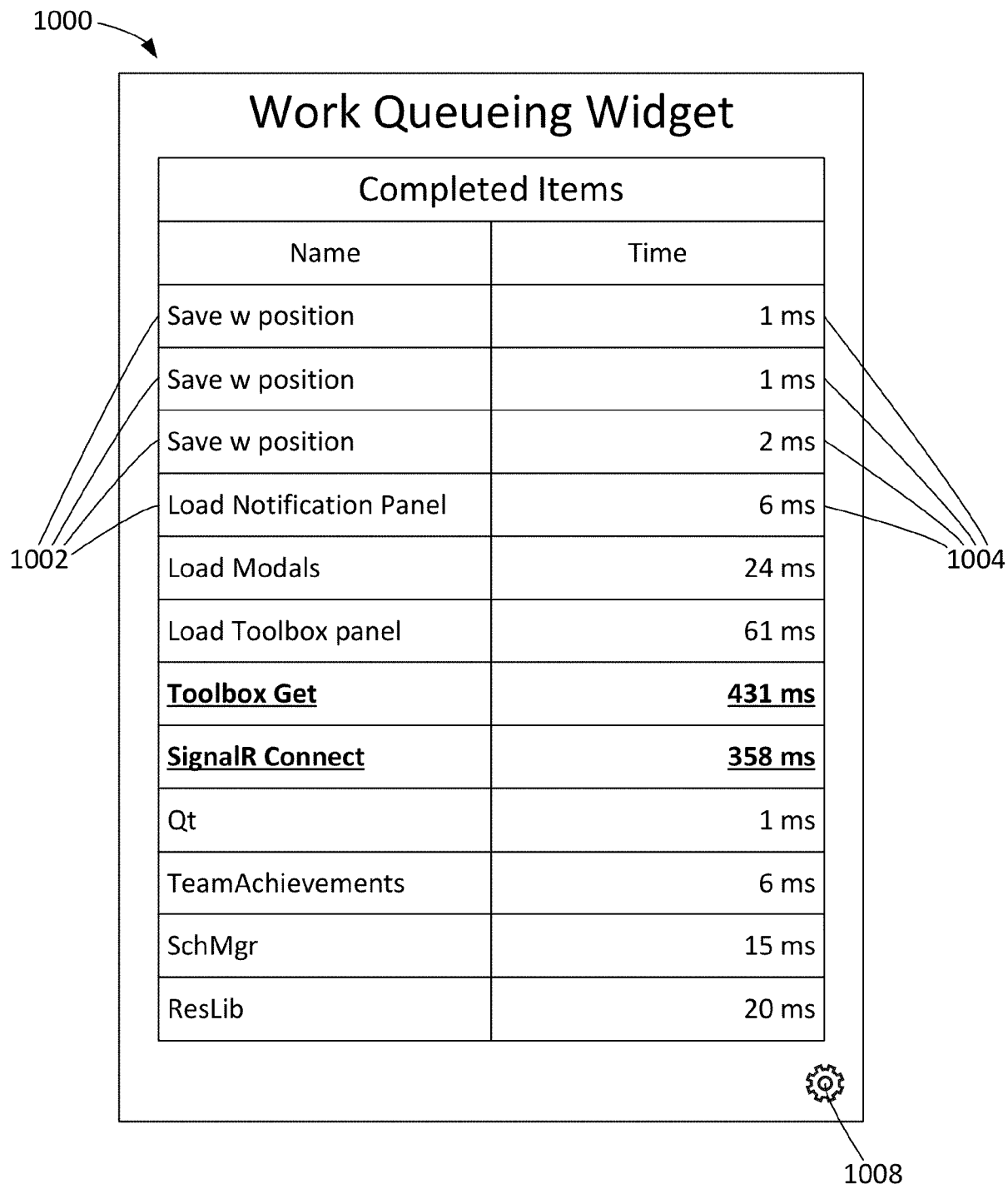
FIG. 10 is a work queuing widget provided by the performance management application, according to an example embodiment.

Referring now to FIG. 10, a work queuing widget 1000 is shown. The work queuing widget 1000 may provide a list of computational tasks 1002 associated with generating the dashboard (e.g., the performance dashboard 200, the performance dashboard 600) of the performance management application 126. In some instances, the work queuing widget 1000 may similarly be included in the performance dashboards (e.g., the performance dashboard 200, the performance dashboard 600) discussed above. Each computational task 1002 is provided with a corresponding task completion time 1004, which signifies the amount of time it takes for the corresponding web browser (e.g., the web browser 120, the web browser 124, the web browser 156) to perform the corresponding computational task 1002.

As illustrated, various computational tasks 1002 may be bolded and underlined within the work queuing widget 1000 to indicate that the task completion time 1004 exceeds a load time threshold for the performance management application 126. In some instances, the various computational tasks 1002 exceeding the load time threshold may be indicated in other manners, such as, for example, highlighting, color-coding, blinking, etc. As alluded to above, the load time threshold may be set to ensure that the performance dashboard and widgets produced by the performance management application 126 are sufficiently responsive.

Each of the various computational tasks 1002 may additionally be clickable by the user to allow the user (e.g., a developer) to find and modify the application code associated with the corresponding computational task 1002. For example, the computational tasks 1002 may provide a pop-up window with information pertaining to where the application code associated with the corresponding computational task 1002 is within the performance management application code as a whole. The user (e.g., a developer) may then modify the application code associated with the corresponding computational task 1002 (e.g., the computational task 1002 that exceeds the load time threshold) to redesign it into multiple smaller computational tasks. In some embodiments, the computational task 1002 may be automatically broken into multiple smaller computational tasks by the work queueing circuit 152. For example, if the code associated with the computational task 1002 that exceeds the load time threshold includes a subsection of code that matches a pre-defined independently-executable code (e.g., code that matches a predefined independently-executable computational task) from a list of pre-defined independently-executable codes, the work queueing circuit 152 may be configured to identify this subsection of code within the entire code associated with the identified computational task 1002, and automatically break the subsection of code out into a separate, smaller independently-executable computational task. As described above, by breaking the computational task 1002 that exceeds the load time threshold into multiple smaller computational tasks, the user can ensure that the performance management application 126 is sufficiently responsive (e.g., responds within a few hundredths or few tenths of a second).

Figure 11:
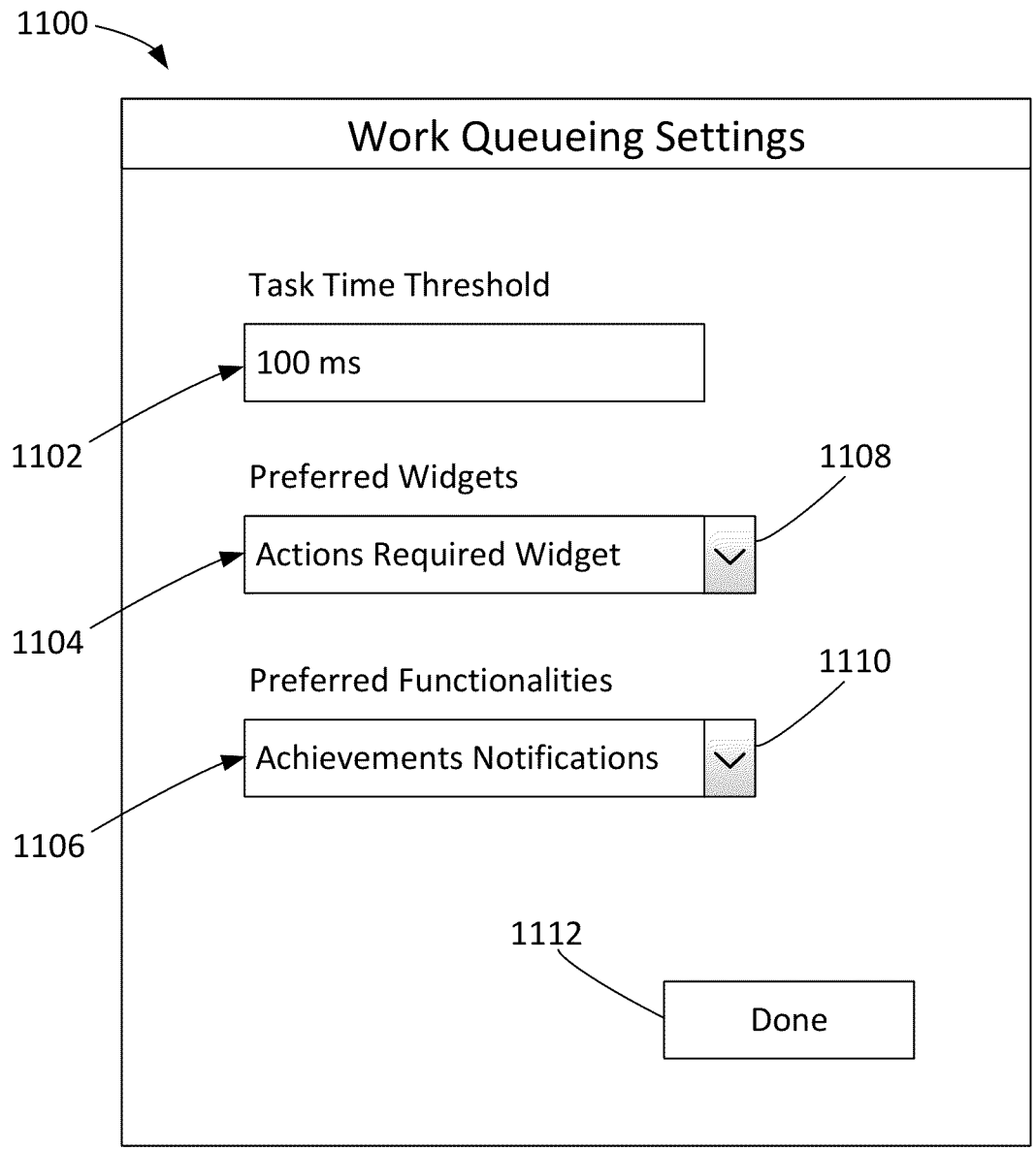
FIG. 11 is a work queuing settings window provided by the performance management application, according to an example embodiment.

The work queuing widget 1000 further includes a settings button 1008 that provides options for the user to customize the work queuing widget 1000 and the work queuing functionality. For example, as shown in FIG. 11, upon clicking the settings button 1008, a work queuing settings window 1100 is provided to the user as a pop up window. The work queuing settings window 1100 includes a task time threshold field 1102, a preferred widgets field 1104, and a preferred functionalities field 1106. The task time threshold field 1102 may initially be auto-populated with the current predetermined task time threshold. In some embodiments, the task time threshold field 1102 may allow for the user to modify the predetermined task time threshold by entering in a new task time threshold. In some instances, the modification of the task time threshold may be restricted to certain users. For example, if the user is a developer of the performance management application 126, the user may be allowed to modify the task time threshold. However, if the user is a non-developer (e.g., a banker, a team manager, a business unit lead) the task time threshold field 1102 may merely show the task time threshold as a non-editable value.

The preferred widgets field 1104 may allow for a user to enter various preferred widgets that they would like to load first upon startup of the performance management application 126 (e.g., upon generation of the various performance dashboards 200, 600 described herein). The user may enter their preferred widgets manually by clicking on the preferred widgets field 1104 and typing in the names of their preferred widgets. The user may also click on a widget dropdown box 1108 to view a list of selectable widgets to add as preferred widgets.

The preferred functionalities field 1106 may similarly allow for a user to enter various preferred functionalities that they would like to be available first upon startup of the performance management application 126 (e.g., upon generation of the various performance dashboards 200, 600 described herein). The user may similarly enter their preferred functionalities manually by clicking on the preferred functionalities field 1106 and typing in the names of their preferred functionalities. The user may also click on a functionality dropdown box 1110 to view a list of selectable functionalities to add as preferred functionalities.

Once the user has updated the predetermined task time threshold, the preferred widgets, and/or the preferred functionalities, the user may then finalize their updates by clicking a 'done' button 1112.

Figure 12:
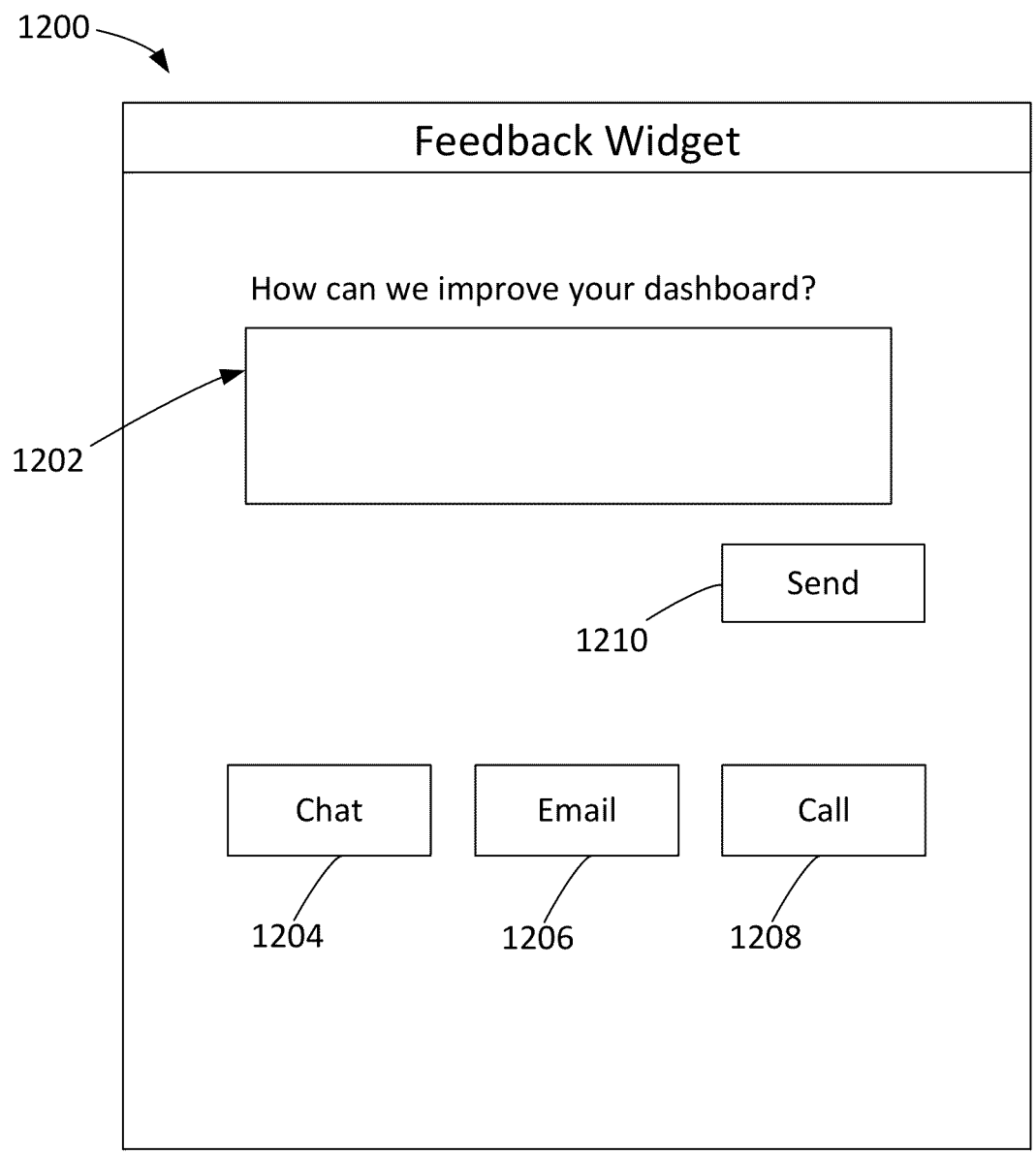
FIG. 12 is a feedback widget provided by the performance management application, according to an example embodiment.

Referring now to FIG. 12, a feedback widget 1200 is shown. In some instances, the feedback widget 1200 may similarly be included in the performance dashboards (e.g., the performance dashboard 200, the performance dashboard 600) discussed above. The feedback widget 1200 provides a direct communication path between the user and the developers of the performance management application 126. For example, the feedback widget 1200 includes a feedback comment field 1202, a chat button 1204, an email button 1206, and a call button 1208. In some instances, the user may send a feedback comment to the developers of the performance management application 126 by clicking in the feedback comment field 1202, typing their feedback comment, and clicking a send button 1210. In some instances, the user may additionally or alternatively choose to contact the developers via a live chat by clicking on the chat button 1204. In some instances, the user may additionally or alternatively choose to contact the developers via email by clicking on the email button 1206, which may provide a direct email address for the developers to the user. In some instances, the user may additionally or alternatively choose to contact the developers via phone by clicking the call button 1208, which may provide a direct phone number for the developers to the user.

Figure 13:
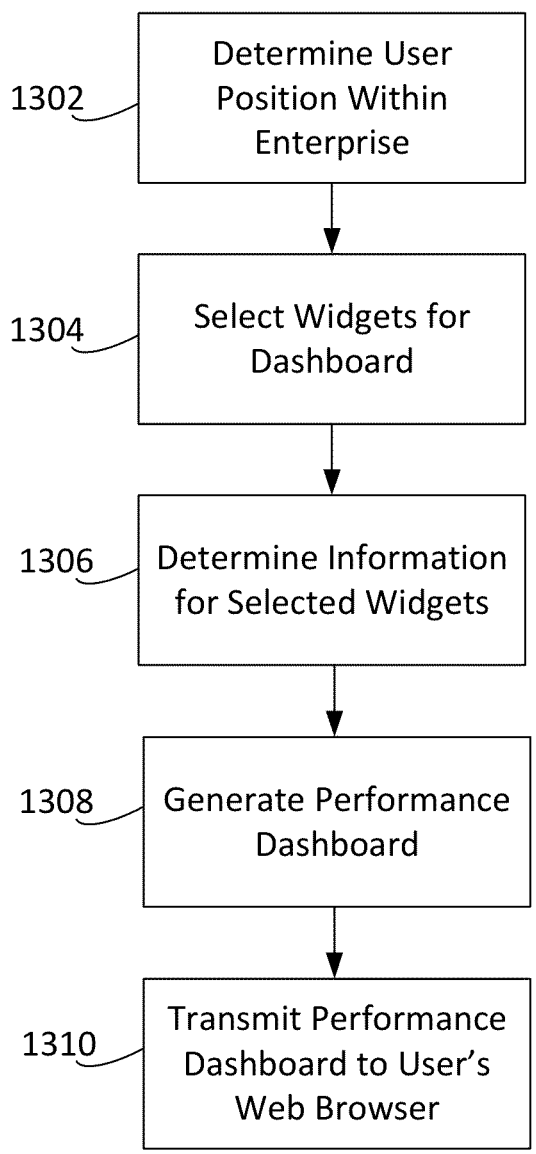
FIG. 13 is a flow diagram of a method of generating a performance dashboard, according to an example embodiment.

Referring to FIG. 13, a flow diagram of a method 1300 of generating a performance dashboard (e.g., the performance dashboard 200, the performance dashboard 600) for a user is shown according to an example embodiment. The method 1300 may be performed by various components of the system 100 (e.g., the business unit computing system 102, the business location computing system 104, the performance management computing system 106). Throughout the method 1300 the performance management computing system 106 determines a user's role within the enterprise, selects various widgets and corresponding information to provide to the user based on their role within the enterprise, generates a performance dashboard including the selected widgets and corresponding information, and transmits the corresponding performance dashboard to the user's web browser.

The method 1300 begins when the performance management computing system 106 (e.g., the performance management application 126) determines the user's role within the enterprise, at step 1302. For example, in some instances, the user may input login information associated with the performance management application 126 into a web browser (e.g., the web browser 120, the web browser 124, the web browser 156). The user's login information may then be transmitted to the performance management computing system 106. The performance management application 126 may then be configured to correlate the user's login information to the user's identity and role within the enterprise. For example, based on the user's login information, the performance management application 126 may be configured to retrieve the user's identity and role within the enterprise from a corresponding database 122, 138, 158 within the system 100.

Once the performance management computing system 106 (e.g., the performance management application 126) has determined the user's role within the enterprise, the performance management application 126 (e.g., using the widget selection circuit 150) is configured to select the widgets to be provided to the user via the dashboard of the performance management application 126, at step 1304. Specifically, the widget selection circuit 150 is configured to select the widgets to be provided to the user based at least in part on the user's role within the enterprise. In some instances, the user may additionally provide various widget preferences to the performance management application 126 via the user's browser (e.g., the web browser 120, the web browser 124, the web browser 156). In these instances, the widget selection circuit 150 may select the widgets to be provided to the user based at least in part on the widget preferences provide by the user.

Once the performance management computing system 106 (e.g., the performance management application 126) has selected the widgets to be provided to the user via the dashboard of the performance management application 126, the performance management application 126 (e.g., using the widget selection circuit 150) is configured to determine the pertinent information to be used to populate the selected widgets, at step 1306. Specifically, the widget selection circuit 150 is similarly configured to determine the pertinent information to be used to populate the selected widgets based on the user's role within the enterprise.

Once the performance management computing system 106 (e.g., the performance management application 126) has determined the pertinent information to be used to populate the selected widgets, the performance management application 126 is configured to retrieve the pertinent information from the various databases 122, 138, 158 and generate the performance dashboard including the selected widgets and the pertinent information, at step 1308. The performance management application 126 is then configured to transmit the performance dashboard to the user via the user's web browser (e.g., the web browser 120, the web browser 124, the web browser 156), at step 1310.

Figure 14:
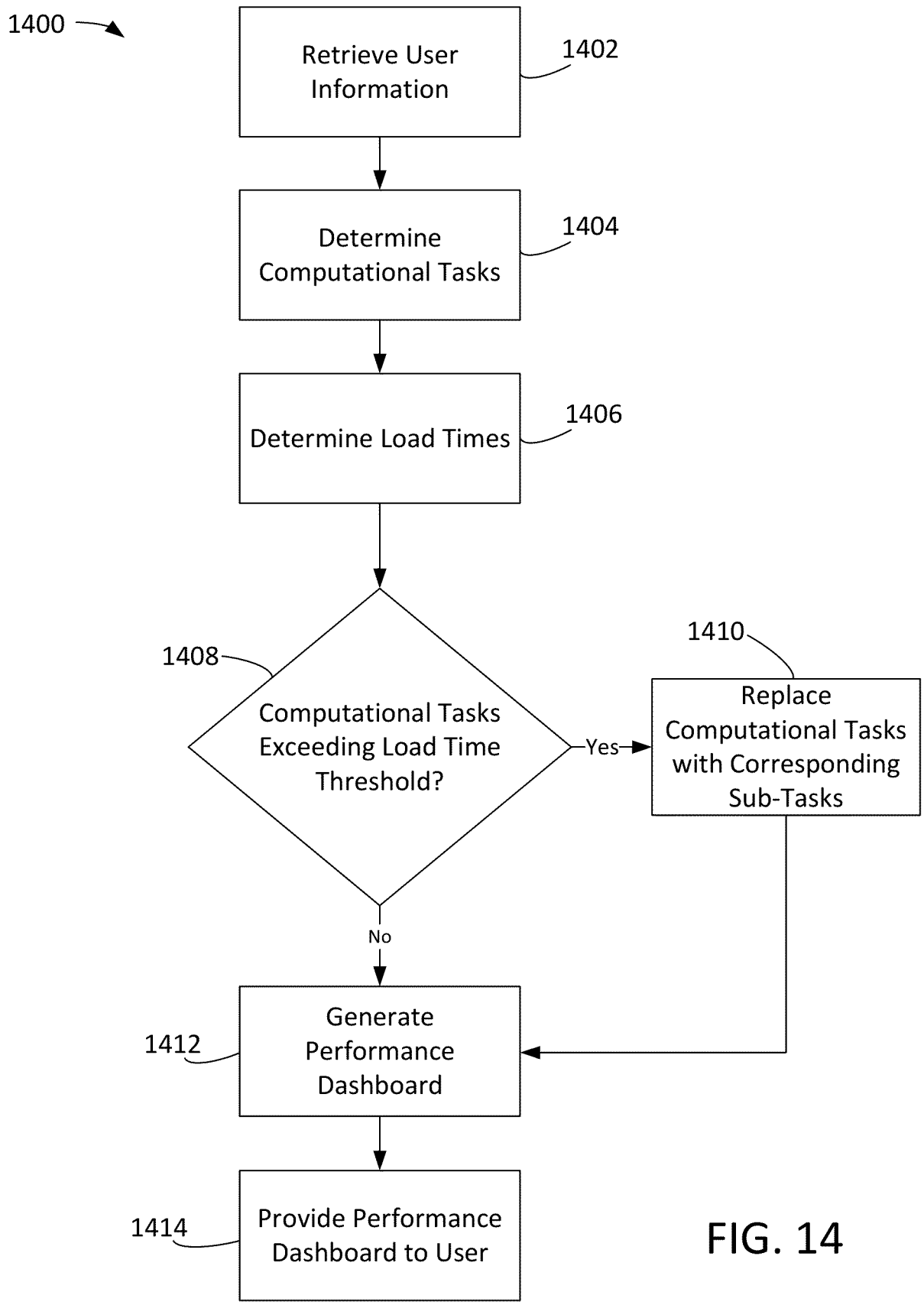
FIG. 14 is a flow diagram of another method of generating a performance dashboard, according to an example embodiment.

Referring to FIG. 14, a flow diagram of a method 1400 of generating a performance dashboard (e.g., the performance dashboard 200, the performance dashboard 600) for a user is shown according to an example embodiment. The method 1400 may be performed by various components of the system 100 (e.g., the business unit computing system 102, the business location computing system 104, the performance management computing system 106). Throughout the method 1400 the performance management computing system 106 (e.g., the performance management application 126) receives user information pertaining to a user, determines various computational tasks required to generate a performance dashboard, and determines a load time associated with each computational task. The performance management application 126 (e.g., the work queuing circuit 152) then identifies any unacceptably large computational tasks, and a developer breaks the identified computational task into (e.g., revises the application code associated with the identified computational to create) multiple smaller sub-tasks configured to collectively achieve the same function as the original unacceptably large computational task. The performance management application 126 then generates the performance dashboard and provides the performance dashboard to the user.

The method 1400 begins when the performance management computing system 106 (e.g., the performance management application 126) retrieves user information, at step 1402. For example, the performance management application 126 may retrieve user information pertaining to a user of the performance management application 126 from any of the databases 122, 138, 158 of the system 100. As described herein, the user information may include task-related information and/or performance-related information pertaining to the user.

The performance management application 126 (e.g., the work queuing circuit 152) may then determine a list of computational tasks required to generate the performance dashboard, at step 1404. For example, the computational tasks may be associated with the creation and placement of the various widgets within the performance dashboard. The computational tasks may also be associated with the population of the various widgets with the corresponding information retrieved from the various databases 122, 138, 158 of the system 100. The performance management application 126 (e.g., the work queuing circuit 152) may then determine a load time corresponding to each computational task, at step 1406.

The performance management application 126 (e.g., the work queuing circuit 152) may then determine which, if any, of the computational tasks have a corresponding load time that exceeds a load time threshold, at step 1408. For example, a user or developer may set the load time threshold for the computational tasks associated with the performance management application 126 to ensure that the performance management application 126 is sufficiently responsive, as described above, with respect to the work queuing circuit 152. If the work queuing circuit 152 determines that one or more computational tasks exceed the load time threshold, at step 1408, the work queuing circuit 152 may notify a developer (e.g., via the work queuing widget 1000). The developer may then edit or revise the application code for any computational task that exceeds the load time threshold to redesign it into multiple smaller sub-tasks configured to collectively achieve the same function as the corresponding larger single computational task. The user or developer may then replace any computational tasks that exceed the load time threshold with the corresponding sub-tasks within the application code, at step 1410, to ensure that the performance dashboard is sufficiently responsive to user input, as described above, with respect to the work queuing circuit 152.

Once any computational tasks exceeding the load time threshold have been replaced with their corresponding sub-tasks within the application code, at step 1410, or if the work queuing circuit 152 determines that none of the computational tasks exceed the load time threshold, at step 1408, the performance management application 126 may generate the performance dashboard, at step 1412. The performance management application 126 may then transmit the performance dashboard to the user via the user's web browser 120, 124, 156, at step 1414.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

An example system for implementing the overall system or portions of the embodiments might include general-purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method for providing a performance dashboard to a user associated with an enterprise, the method comprising:

retrieving, by a performance management computing system, user information pertaining to the user;

determining, by a work queuing circuit of the performance management computing system, a list of computational tasks associated with generating the performance dashboard based at least in part on the user information;

determining, by the work queuing circuit, a load time for each computational task of the list of computational tasks;

identifying, by the work queuing circuit, at least one computational task within the list of computational tasks having a corresponding load time that exceeds a load time threshold;

replacing, by the work queuing circuit, the at least one computational task within the list of computational tasks with a plurality of sub-tasks configured to collectively achieve the at least one computational task, wherein replacing the at least one computational task with the plurality of sub-tasks comprises:

determining, by the work queuing circuit, that a subsection of code associated with the at least one computational task matches a pre-defined independently executable code from a list of pre-defined independently executable codes and automatically breaking the subsection of code out into a sub-task of the plurality of sub-tasks; and subsequent to replacing the at least one computational task within the list of computational tasks with the plurality of sub-tasks, generating, by the performance management computing system, the performance dashboard on a single-threaded web browser of the user by performing each computational task of the list of computational tasks sequentially, wherein the performance dashboard is unresponsive to user input while performing each computational task and is responsive to the user input between sequential computational tasks.

2. The method of claim 1, wherein the user information comprises a role of the user within the enterprise and the method further comprises:

selecting at least one widget to arrange within a framework of the performance dashboard, the at least one widget being selected based at least partially on the role of the user within the enterprise; and determining user-specific information to be used to populate the at least one widget, wherein the user-specific information is determined based at least partially on the role of the user within the enterprise.

3. The method of claim 2, wherein the performance dashboard comprises framework application code and widget application code, the framework application code corresponds to the framework of the performance dashboard, the widget application code corresponds to the at least one widget, and the framework application code and the widget application code are transmitted separately to the single-threaded web browser of the user.

4. The method of claim 3, wherein the framework application code of the performance dashboard is automatically stored within cache-type memory by the single-threaded web browser of the user.

5. The method of claim 2, further comprising receiving, from the user, at least one preferred widget, and wherein loading of the at least one preferred widget is prioritized upon startup of the performance dashboard.

6. The method of claim 1, wherein the performance dashboard includes at least one of an actions required widget, a performance manager widget, a report library widget, a self-evaluation widget, a personal achievements widget, a team achievements widget, a work queueing widget, and a feedback widget.

7. A method for providing a performance dashboard to a user associated with an enterprise, the method comprising:

selecting, by a widget selection circuit of a performance management computing system, at least one widget to include in the performance dashboard, the at least one widget being selected based at least partially on a role of the user within the enterprise;

determining, by the widget selection circuit, user-specific information to be used to populate the at least one widget, wherein the user-specific information is determined based at least partially on the role of the user within the enterprise;

receiving, by the performance management computing system, at least one preferred widget from the user;

determining, by a work queuing circuit of the performance management computing system, a list of computational tasks associated with generating the performance dashboard, determining, by the work queuing circuit, a load time for each computational task of the list of computational tasks;

identifying, by the work queuing circuit, at least one computational task within the list of computational tasks having a corresponding load time that exceeds a load time threshold;

replacing, by the work queuing circuit, the at least one computational task within the list of computational tasks with a plurality of sub-tasks configured to collectively achieve the at least one computational task, wherein replacing the at least one computational task with the plurality of sub-tasks comprises:

determining, by the work queuing circuit, that a subsection of code associated with the at least one computational task matches a pre-defined independently executable code from a list of pre-defined independently executable codes and automatically breaking the subsection of code out into a sub-task of the plurality of sub-tasks; and subsequent to replacing the at least one computational task within the list of computational tasks with the plurality of sub-tasks, generating, by the performance management computing system, the performance dashboard on a single-threaded web browser of the user by performing each computational task of the list of computational tasks sequentially, the performance dashboard including the at least one widget populated with the user-specific information and the at least one preferred widget, wherein loading of the at least one preferred widget is prioritized over at least one other widget included in the performance dashboard upon startup of the performance dashboard, wherein the performance dashboard is unresponsive to user input while performing each computational task and is responsive to the user input between sequential computational tasks.

8. The method of claim 7, further comprising determining the role of the user within the enterprise by correlating login information provided by the user to the role of the user within the enterprise.

9. The method of claim 7, wherein the load time threshold is between one tenth of a second and three tenths of a second.

10. The method of claim 7, wherein the at least one widget is configured to be arranged within a framework of the performance dashboard, the framework comprises framework application code, the at least one widget comprises widget application code, and the framework application code and the widget application code are transmitted separately to the single-threaded web browser of the user.

11. The method of claim 10, wherein the framework application code of the performance dashboard is automatically stored within cache-type memory by the single-threaded web browser of the user.

12. The method of claim 7, wherein the performance dashboard includes at least one of an actions required widget, a performance manager widget, a report library widget, a self-evaluation widget, a personal achievements widget, a team achievements widget, a work queueing widget, and a feedback widget.

13. A performance management system comprising:

a business unit computing system associated with an enterprise and including a business unit database and a business unit web browser;

a business location computing system in communication with the business unit computing system, associated with the enterprise, and including a business location database and a business location web browser;

a performance management computing system in communication with the business unit computing system and the business location computing system, associated with the enterprise, and including an enterprise database, a performance management web browser, a graphical user interface, and a processor coupled to machine readable storage media having instructions stored therein that, when executed by the processor, cause the processor to:

retrieve user information pertaining to a user from at least one of the business unit database, the business location database, and the enterprise database;

determine, by a work queuing circuit of the processor, a list of computational tasks associated with generating a performance dashboard based at least in part on the user information;

determine, by the work queuing circuit, a load time for each computational task of the list of computational tasks;

identify, by the work queuing circuit, at least one computational task within the list of computational tasks having a corresponding load time that exceeds a load time threshold;
replace, by the work queuing circuit, the at least one computational task within the list of computational tasks with a plurality of sub-tasks configured to collectively achieve the at least one computational task, wherein replacing the at least one computational task with the plurality of sub-tasks comprises:
  determining, by the work queuing circuit, that a subsection of code associated with the at least one computational task matches a pre-defined independently executable code from a list of pre-defined independently executable codes and automatically breaking the subsection of code out into a sub-task of the plurality of sub-tasks;
subsequent to replacing the at least one computational task within the list of computational tasks with the plurality of sub-tasks, generate the performance dashboard on at least one of the business unit web browser, the business location web browser, and the performance management web browser for viewing by the user, the at least one of the business unit web browser, the business location web browser, and the performance management web browser being a single-threaded web browser, and the performance dashboard being generated by performing each computational task of the list of computational tasks sequentially,
wherein the performance dashboard is unresponsive to user input while performing each computational task and is responsive to the user input between sequential computational tasks.

14. The performance management system of claim 13, wherein the instructions, when executed by the processor, further cause the processor to:
receive, from the user, at least one preferred widget, and wherein loading of the at least one preferred widget is prioritized upon startup of the performance dashboard.

15. The performance management system of claim 13, wherein the performance management computing system includes cache-type memory and the instructions, when executed by the processor, further cause the processor to store the user information in the cache-type memory.

16. The performance management system of claim 13, wherein at least one of the business unit database, the business location database, and the enterprise database are a multidimensional database.

17. The performance management system of claim 13, wherein the user information comprises a role of the user within the enterprise and the instructions, when executed by the processor, further cause the processor to:
select at least one widget to arrange within a framework of the performance dashboard, the at least one widget being selected based at least partially on the role of the user within the enterprise; and
determine user-specific information to be used to populate the at least one widget, wherein the user-specific information is determined based at least partially on the role of the user within the enterprise.

18. The performance management system of claim 17, wherein the performance dashboard comprises framework application code and widget application code, the framework application code corresponds to the framework of the performance dashboard, the widget application code corresponds to the at least one widget, and the framework application code and the widget application code are transmitted separately to the at least one of the business unit web browser, the business location web browser, and the performance management web browser for viewing by the user.

* * * * *